(12) United States Patent
Kiyoyanagi et al.

(10) Patent No.: US 9,493,630 B2
(45) Date of Patent: Nov. 15, 2016

(54) EPOXY RESIN COMPOSITION FOR TRANSPARENT SHEETS AND CURED PRODUCT THEREOF

(71) Applicant: Nippon Kayaku Kabushiki Kaisha, Chiyoda-ku, Tokyo (JP)

(72) Inventors: Noriko Kiyoyanagi, Tokyo (JP); Masataka Nakanishi, Tokyo (JP); Yoshihiro Kawata, Tokyo (JP); Junko Ichikawa, Tokyo (JP); Toru Kurihashi, Tokyo (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 0 days.

(21) Appl. No.: 14/958,113

(22) Filed: Dec. 3, 2015

(65) Prior Publication Data

US 2016/0083615 A1 Mar. 24, 2016

Related U.S. Application Data

(62) Division of application No. 13/878,564, filed as application No. PCT/JP2011/076250 on Nov. 15, 2011, now Pat. No. 9,328,217.

(30) Foreign Application Priority Data

| Nov. 17, 2010 | (JP) | 2010-256578 |
| Dec. 10, 2010 | (JP) | 2010-276139 |
| Feb. 1, 2011 | (JP) | 2011-019726 |

(51) Int. Cl.
*C08L 63/00* (2006.01)
*C08K 5/12* (2006.01)
(Continued)

(52) U.S. Cl.
CPC ............. *C08K 5/12* (2013.01); *C08G 59/4215* (2013.01); *C08G 59/4246* (2013.01);
(Continued)

(58) Field of Classification Search
CPC .. C08G 59/4246; C08G 59/4215; C08K 5/12; C08L 63/00; C08L 67/02; C08L 2201/08; C08L 2201/10; C08L 2205/025; G02B 1/04; G02B 1/14; D06M 15/55; C09D 163/00; Y10T 442/2951
USPC ........................................................ 525/533
See application file for complete search history.

(56) References Cited

U.S. PATENT DOCUMENTS

| 5,196,485 A | 3/1993 | McMonigal et al. |
| 6,268,055 B1 | 7/2001 | Walters et al. |

(Continued)

FOREIGN PATENT DOCUMENTS

| CN | 1455960 A | 11/2003 |
| GB | 1418801 A | 12/1975 |

(Continued)

OTHER PUBLICATIONS

International Search Report/Written Opinion mailed Dec. 13, 2011 in corresponding PCT application No. PCT/JP2011/076250.

(Continued)

*Primary Examiner* — David Karst
(74) *Attorney, Agent, or Firm* — Nields, Lemack & Frame, LLC

(57) ABSTRACT

A cured product obtainable by curing an epoxy resin composition that is suitable for producing optical sheets. The epoxy resin composition includes a polyvalent carboxylic acid (A) represented by formula (I):

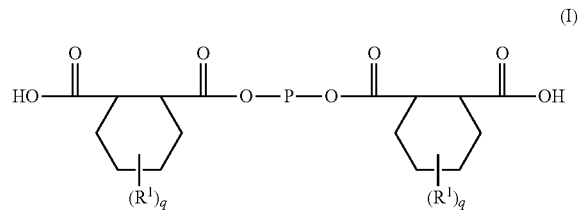

wherein, $R^1$'s each independently represent a hydrogen atom, an alkyl group having 1 to 15 carbon atoms, or a carboxyl group; q represents the number of substituent $R^1$'s, and represents an integer from 1 to 4; and P represents the following X:

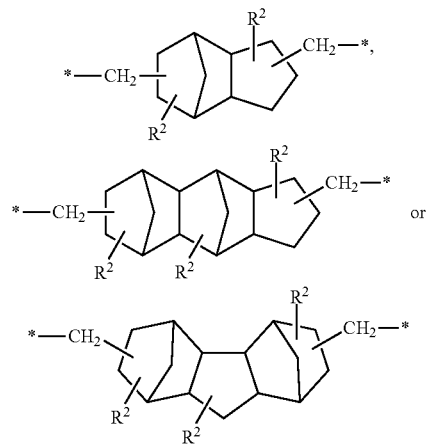

wherein there may be a plural number of $R^2$'s per ring, and $R^2$'s each independently represent a hydrogen atom or a methyl group; and * represents a bonding site linked to the oxygen atom; and an epoxy resin (B) having an aliphatic cyclic structure in the molecule.

11 Claims, No Drawings

(51) Int. Cl.
*C08G 59/42* (2006.01)
*G02B 1/04* (2006.01)
*D06M 15/55* (2006.01)
*C08L 67/02* (2006.01)
*G02B 1/14* (2015.01)
*C09D 163/00* (2006.01)

(52) U.S. Cl.
CPC ............... *C08L 63/00* (2013.01); *C08L 67/02* (2013.01); *C09D 163/00* (2013.01); *D06M 15/55* (2013.01); *G02B 1/04* (2013.01); *G02B 1/14* (2015.01); *C08L 2201/08* (2013.01); *C08L 2201/10* (2013.01); *C08L 2205/025* (2013.01); *Y10T 442/2951* (2015.04)

(56) References Cited

U.S. PATENT DOCUMENTS

| | | |
|---|---|---|
| 2003/0080341 A1 | 5/2003 | Sakano et al. |
| 2005/0272896 A1 | 12/2005 | Kaji et al. |
| 2007/0128376 A1 | 6/2007 | Harada et al. |
| 2008/0167429 A1 | 7/2008 | Satou |
| 2013/0323994 A1 | 12/2013 | Kiyoyanagi et al. |
| 2016/0083576 A1 | 3/2016 | Kiyoyanagi et al. |
| 2016/0090440 A1 | 3/2016 | Kiyoyanagi et al. |

FOREIGN PATENT DOCUMENTS

| | | |
|---|---|---|
| JP | 4-363054 A | 12/1992 |
| JP | 6-337408 A | 12/1994 |
| JP | 2000-119374 A | 4/2000 |
| JP | 2003-277473 A | 10/2003 |
| JP | 2004-233851 A | 8/2004 |
| JP | 2004-269727 A | 9/2004 |
| JP | 2005-156840 A | 6/2005 |
| JP | 2005-330475 A | 12/2005 |
| JP | 2008-56848 A | 3/2008 |
| JP | 2009-114390 A | 5/2009 |
| JP | 2010-032991 A | 2/2010 |
| WO | 2010/001919 A1 | 1/2010 |
| WO | 2010/150524 A1 | 12/2010 |

OTHER PUBLICATIONS

International Preliminary Report on Patentability issued Jun. 12, 2013 in corresponding PCT application No. PCT/JP2011/076250.
Chinese communication, with English translation, issued Sep. 25, 2014 in corresponding Chinese patent application No. 201180054901.3.
Chinese communication, with English translation, issued Mar. 2, 2015 in corresponding Chinese patent application No. 201180054901.3.
British communication, dated Nov. 23, 2015 in corresponding British patent application No. GB1306879.6.
Office mailed Sep. 16, 2015 in co-pending U.S. Appl. No. 13/878,564.
Notice of Allowance mailed Jan. 20, 2016 in co-pending U.S. Appl. No. 13/878,564.
Notice of Allowance mailed Feb. 8, 2016 in co-pending U.S. Appl. No. 13/878,564.
Office action mailed Mar. 31, 2016 in co-pending U.S. Appl. No. 14/958,116.
Office action mailed Apr. 13, 2016 in co-pending U.S. Appl. No. 14/958,121.
Notice of allowance mailed Aug. 2, 2016 in co-pending U.S. Appl. No. 14/958,116.
Final rejection mailed Aug. 1, 2016 in co-pending U.S. Appl. No. 14/958,121.
British communication dated Jul. 7, 2016 in corresponding British patent application No. GB1601442.5.
Chinese communication, with English translation, dated Aug. 2, 2016 in corresponding Chinese patent application No. 201510025575.3.

EPOXY RESIN COMPOSITION FOR TRANSPARENT SHEETS AND CURED PRODUCT THEREOF

This application is a divisional of U.S. patent application Ser. No. 13/878,564 filed May 21, 2013, the disclosure of which is incorporated herein by reference. U.S. patent application Ser. No. 13/878,564 is a 371 of International Application No. PCT/JP2011/076250 filed Nov. 15, 2011, which claims priority of Japanese Patent Application No. 2010-256578 filed Nov. 17, 2010, Japanese Patent Application No. 2010-276139 filed Dec. 10, 2010 and Japanese Patent Application No. 2011-019726 filed Feb. 1, 2011.

TECHNICAL FIELD

The present invention relates to an epoxy resin composition that is used in transparent sheets, and a cured product thereof. More particularly, the present invention relates to an epoxy resin composition that is suitable for optical sheets which exhibit excellent transparency, heat resistance, strength, smoothness and light resistance, and a cured product thereof.

BACKGROUND ART

Curable resin compositions comprising epoxy resins are utilized as resins having excellent heat resistance in the fields of construction, civil engineering, automobiles, aircrafts and the like. Even in the field of semiconductor-associated materials, the epoxy resins used in electronic devices are required to have superior characteristics, and also, in recent years, utilization of epoxy resins in the field related to optoelectronics engineering is attracting public attention.

Display apparatuses such as liquid crystal displays, plasma displays, EL displays and portable devices have been distributed to general consumers, and in addition to the demand for size increase, weight reduction and thickness reduction, there is also an increasing demand for display in curved surfaces, three-dimensional display and the like. In the display elements of such apparatuses or in optical members such as a front panel, glass plates have been widely used in order to meet various requirements such as transparency, hardness, chemical resistance, and gas barrier properties. However, glass plates have a problem that they are susceptible to cracking and are heavy. Thus, in order to solve this problem, plastic materials such as epoxy resins have been examined as a substitute of glass plates, and various suggestions have been made.

For example, Patent Literature 1 describes a transparent resin substrate for liquid crystal display elements, which uses an epoxy resin, an acid anhydride-based curing agent, and an alcohol. Furthermore, Patent Literatures 2 and 3 describe transparent substrates each using a glass cloth and a heat-curable resin, and Patent Literature 4 describes a resin sheet using a cured resin layer comprising a cloth-like body made of glass fiber and inorganic particles.

Glass substitute plastic materials including these are prone to undergo warpage or cracking as a result of shrinkage at the time of curing in the production process thereof, and it is difficult to obtain smooth sheets. Furthermore, since glass substitute plastic materials have larger coefficients of linear expansion as compared with glass plates, problems may occur due to expansion or shrinkage even at the time of use, and further, sufficient performances that are required in the market as substitutes of glass, such as color, heat resistance, light resistance and hardness, are not obtained. Even in regard to the methods suggested in the documents described above, it cannot be said that the methods give satisfactory results in terms of color. Particularly in connection with the slight increase in refractive index, many of the substrate materials have low values of the transmittance at a short wavelength of near 400 nm, and thus it can be seen that coloration into yellow color or the like is exhibited. When a substrate material is used for optical applications, it is required that the material have a high transmittance at near 400 nm. For example, in the methods suggested in Patent Literatures 2 and 3, the transmittance of visible light at 400 nm is less than 90%. In the method suggested in Patent Literature 4, the transmittance is a transmittance of visible light at 550 nm, but the value is still less than 90%.

The problem of warpage or cracking at the time of production and the problem of expansion or shrinkage at the time of use may be ameliorated by using a glass cloth or an inorganic filler in combination. However, in order to obtain transparency, it is necessary to have the refractive index of the glass cloth or inorganic filler fit to the refractive index of the resin, there are limitations on the materials that may be used, and thus it becomes difficult to satisfy other properties.

Examples of the curing agent for epoxy resins that are generally used in such fields include acid anhydride-based compounds. Particularly, acid anhydrides formed from saturated hydrocarbons are frequently utilized because cured products thereof have excellent light resistance. Common examples of these acid anhydrides include alicyclic acid anhydrides such as methyltetrahydrophthalic anhydride, hexahydrophthalic anhydride, and tetrahydrophthalic anhydride, and among them, methylhexahydrophthalic anhydride, methyltetrahydrophthalic anhydride and the like, which are liquid at normal temperature, are primarily used from the viewpoint of easy handleability.

However, since the alicyclic acid anhydrides described above have high vapor pressures, when an epoxy resin is cured in an open system by using one of these compounds as a curing agent for epoxy resin, as this compound itself volatilizes in the atmosphere, there occur not only environmental contamination and adverse effects on human body caused by the release of hazardous compounds to the atmosphere, but there is also a problem that contamination of the production line, and curing failure of the epoxy resin composition caused by the absence of a predetermined amount of a carboxylic acid anhydride (curing agent) in the cured product, may occur. Furthermore, the characteristics of an epoxy resin composition are changed to a large extent by the curing conditions, and it is difficult to obtain a cured product having the intended performance in a stable manner.

Particularly, in optical applications, it is necessary to have the refractive index of an inorganic material such as a glass cloth fit to the refractive index of the resin in order to obtain transparent sheets. However, if the curing agent in the resin volatilizes in a large amount at the time of curing, an intended refractive index may not be obtained, and there occurs a serious problem that defective transparency is obtained.

Anyways, it is difficult to have transparency that may substitute glass, reduction of shrinkage at the time of curing, and the conditions of color, heat resistance, light resistance, hardness and smoothness altogether, and a material that may satisfy all of these conditions has not been obtained yet.

CITATION LIST

Patent Literature

Patent Literature 1: JP 6-337408 A
Patent Literature 2: JP 2004-233851 A

Patent Literature 3: JP 2004-269727 A
Patent Literature 4: JP 2005-156840 A

SUMMARY OF INVENTION

Technical Problem

It is an object of the present invention to provide an epoxy resin composition which is suitable for the production of optical sheets that may be used in liquid crystal displays, plasma displays, EL displays, display devices for portable equipment or the like, and solar cells, and a cured product thereof that is excellent in transparency, heat resistance, strength, light resistance, smoothness, and the like.

Solution to Problem

The inventors of the present invention conducted a thorough investigation in order to solve the problems described above, and as a result, they found that an epoxy resin composition having a particular composition and a cured product thereof solve the problems described above, thus completing the present invention.

That is, the present invention relates to the following:

(1) an epoxy resin composition for optical sheets, the composition comprising a polyvalent carboxylic acid (A) represented by formula (I):

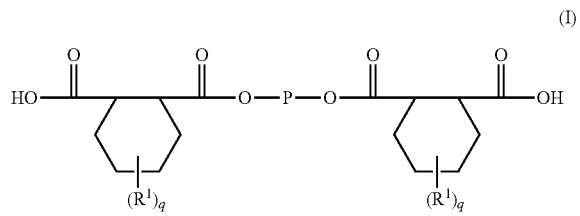

(wherein, $R^1$'s each independently represent a hydrogen atom, an alkyl group having 1 to 15 carbon atoms, and preferably an alkyl group having 1 to 6 carbon atoms or a carboxyl group; q represents the number of substituent $R^1$'s and represents an integer from 1 to 4; and P represents any one of the following x, y and z)

x.

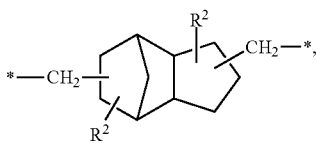

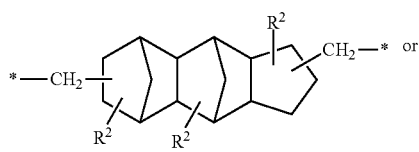

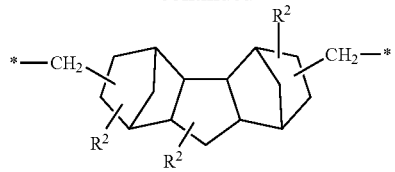

(wherein, there may be a plural number of $R^2$'s per ring, and $R^2$'s each independently represent a hydrogen atom or a methyl group; and * represents a bonding site linked to the oxygen atom)

y. A linear alkylene linker having 6 to 20 carbon atoms, with a main chain having 3 or more carbon atoms and being substituted with an alkyl group in at least one site;

z.

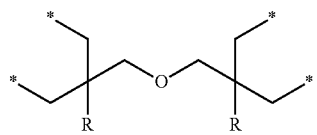

(wherein, R's each independently represent a hydrogen atom, an alkyl group having 1 to 15 carbon atoms, or a carboxyl group; and * represents a bonding site linked to the oxygen atom)

an epoxy resin (B) having an aliphatic cyclic structure in the molecule;

(x-1) the resin composition as described in (1), wherein P of the polyvalent carboxylic acid (A) is x;

(x-2) the resin composition as described in (x-1), wherein $R^2$'s of the polyvalent carboxylic acid (A) are all hydrogen atoms;

(x-3) the resin composition as described in (x-2), wherein 50 mol % or more of all $R^1$'s of the polyvalent carboxylic acid (A) consists of a methyl group and/or a carboxyl group;

(x-4) the resin composition as described in any one of (x-1) to (x-3), wherein the polyvalent carboxylic acid (A) is a reaction product between at least one bridged polycyclic diol compound selected from tricyclodecanedimethanol and pentacyclopentadecanedimethanol, and at least one acid anhydride selected from methylhexahydrophthalic anhydride and cyclohexane-1,2,4-tricarboxylic acid anhydride;

(y-1) the resin composition as described in (1), wherein P in the polyvalent carboxylic acid (A) is y;

(y-2) the resin composition as described in (y-1), wherein the main chain of P in the polyvalent carboxylic acid (A) is substituted with alkyl groups at two or more sites, and at least one of the alkyl groups has 2 to 10 carbon atoms;

(y-3) the resin composition as described in (y-1) or (y-2), wherein the polyvalent carboxylic acid (A) is a reaction product between a linear diol compound having a linear alkylene which has 1 to 20 carbon atoms and is substituted with an alkyl group in at least one site, and at least one acid anhydride selected from methylhexahydrophthalic anhydride, hexahydrophthalic anhydride, and cyclohexane-1,2,4-tricaboxylic acid anhydride;

(z-1) the resin composition as described in (1), wherein P in the polyvalent carboxylic acid (A) is z;

(z-2) the resin composition as described in (z-1), wherein represents a methyl group;

(2) the resin composition as described in (1), wherein the epoxy resin (B) having an aliphatic cyclic structure in the molecule is a compound represented by formula (II):

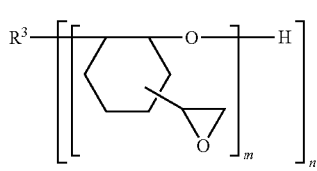

(wherein, $R^3$ represents an alkoxy group; m is an average value and represents an integer from 1 to 20; and n represents an integer from 1 to 10)

(3) the resin composition as described in (1), further comprising an aromatic polyfunctional epoxy resin (C) having three or more epoxy groups in the molecule;

(4) the resin composition as described in (3), wherein the aromatic polyfunctional epoxy resin (C) having three or more epoxy groups in the molecule is a compound represented by formula (III):

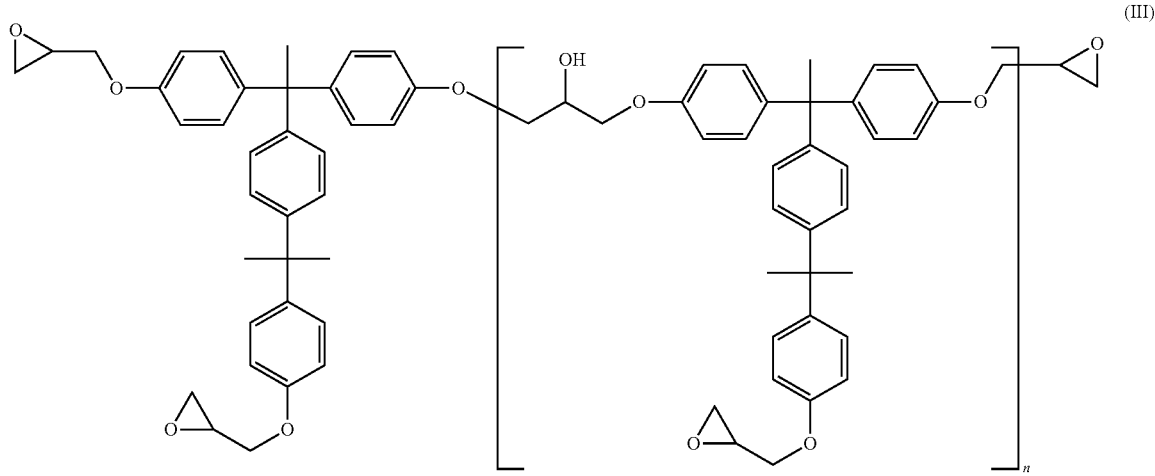

(wherein, n represents an integer of 1 or 2)

(5) the resin composition as described in any one of (1), (2), (3) and (4), further comprising an epoxy resin (D) other than the epoxy resin (B) having an aliphatic cyclic structure and the aromatic polyfunctional epoxy resin (C) having three or more epoxy groups in the molecule, and an acid anhydride;

(6) a cured product obtainable by curing the resin composition described in any one of (1), (2), (3) and (4), the cured product having a refractive index at 25° C. of 1.50 or higher;

(7) a cured product obtainable by impregnating a glass cloth with the resin composition as described in any one of (1), (2), (3) and (4), the cured product having a refractive index at 25° C. of 1.51 or higher; and (8) an optical sheet using the cured product as described in (6) or (7).

Advantageous Effects of Invention

The epoxy resin composition for optical sheets (hereinafter, referred to as epoxy resin composition) of the present invention has satisfactory stability, and a cured product thereof exhibits excellent transparency, heat resistance, strength, smoothness and light resistance. Therefore, the epoxy resin composition is particularly suitable for optical sheets that are used in liquid crystal displays, plasma displays, EL displays, display devices for portable equipment, and solar cells.

DESCRIPTION OF EMBODIMENTS

The polyvalent carboxylic acid (A) used in the present invention is represented by the following formula (I):

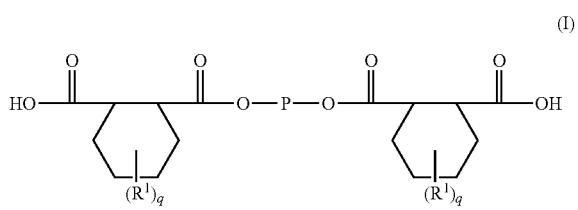

(wherein, $R^1$'s each independently represent a hydrogen atom, an alkyl group having 1 to 15 carbon atoms, preferably an alkyl group having 1 to 6 carbon atoms, or a carboxyl group; q represents the number of substituent $R^1$'s and represents an integer from 1 to 4; and P represents any one of the following x, y and z)

x.

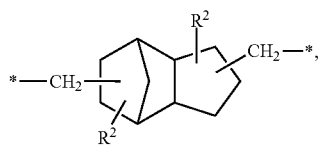

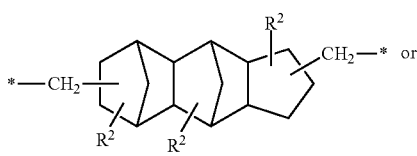

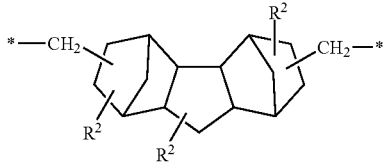

(wherein, there may be a plural number of $R^2$'s per ring, and $R^2$'s each independently represent a hydrogen atom or a methyl group; and * represents a bonding site linked to the oxygen atom)

y. A linear alkylene linker having 6 to 20 carbon atoms, with a main chain having 3 or more carbon atoms and being substituted with an alkyl group in at least one site;

z.

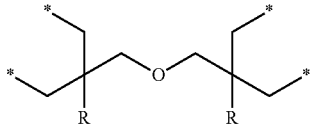

(wherein, R's each independently represent a hydrogen atom, an alkyl group having 1 to 15 carbon atoms, or a carboxyl group; and * represents a bonding site linked to the oxygen atom).

Meanwhile, the polyvalent carboxylic acid (A) is obtained by a production method that will be described below, but in the following descriptions, for convenience, the polyvalent carboxylic acid includes single compounds of the polyvalent carboxylic acid represented by formula (I) as well as mixtures of two or more kinds of the polyvalent carboxylic acid.

A production method for a polyvalent carboxylic acid (A) in which P in formula (I) represents x (hereinafter, for the convenience in explanation, such a carboxylic acid will be referred to as polyvalent carboxylic acid (A-x)) will be described.

The polyvalent carboxylic acid (A-x) is produced by an addition reaction between an acid anhydride and a bridged polycyclic diol. The acid anhydride is a polyvalent carboxylic acid anhydride having one or more alkyl-substituted, carboxyl group-substituted or unsubstituted acid anhydride structure having a cyclohexane structure in the molecule, and specific examples thereof may include, but not limited to, 1,2,4-cyclohexanetricarboxylic acid-1,2-anhydride, 4-methylcyclohexane-1,2-dicarboxylic acid anhydride, and cyclohexane-1,2-dicarboxylic acid anhydride. Mixtures of two or more kinds of these may also be used. In view of emphasizing optical characteristics in particular in the present invention, it is preferable to use 1,2,4-cyclohexanetricarboxylic acid-1,2-anhydride or 4-methylcyclohexane-1,2-dicarboxylic acid anhydride, and particularly from the viewpoint of the balance between heat resistance and handling, it is preferable to use the two compounds as a mixture.

In the above description, examples of the bridged polycyclic diol include diols having a tricyclodecane structure or a pentacyclopentadecane structure represented by the following formula (VI) as the backbone structure. These diols may be used singly, or two or more kinds may be used as mixtures.

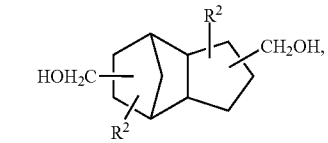

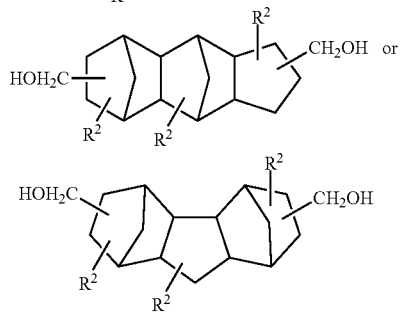

(wherein, there may be a plural number of $R^2$'s per ring, and $R^2$'s each independently represent a hydrogen atom or a methyl group).

Specific examples thereof may include tricyclodecane dimethanol, methyltricyclodecane dimethanol, and pentacyclopentadecane dimethanol. When high heat resistance is required from the cured product, it is preferable to use tricyclodecane dimethanol.

The reaction between an acid anhydride and a bridged polycyclic diol is generally an addition reaction catalyzed by an acid or a base, but since the catalyst may cause coloration, particularly a reaction without catalyst is preferable in the present invention.

When a catalyst is used, examples of the catalyst that may be used include acidic compounds such as hydrochloric acid, sulfuric acid, methanesulfonic acid, trifluoromethanesulfonic acid, para-toluenesulfonic acid, nitric acid, trifluoroacetic acid, and trichloroacetic acid; metal hydroxides such as sodium hydroxide, potassium hydroxide, calcium hydroxide, and magnesium hydroxide; amine compounds such as triethylamine, tripropylamine, and tributylamine; heterocyclic compounds such as pyridine, dimethylaminopyridine 1,8-diazabicyclo[5.4.0]undec-7-ene, imidazole, triazole, and tetrazole; various heterocyclic compounds such as 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl, 4-methylimidazole(1'))ethyl-s-triazine, 2,4-diamino-6 (2'-methylimidazole (1'))ethyl-s-triazine•isocyanur ic acid adduct, a 2:3 adduct of 2-methylimidazoleisocyanuric acid, 2-phenylimidazoleisocyanuric acid adduct, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole; and salts of those heterocyclic compounds and polyvalent carboxylic acids such as phthalic acid, isophthalic acid, terephthalic acid, trimellitic acid, pyromellitic acid, naphthalenedicarboxylic acid, maleic acid, and oxalic acid; amides such as dicyandiamide; diaza compounds such as 1,8-diazabicyclo(5.4.0)undecene-7, salts thereof such as tetraphenyl borate and phenol-novolac thereof, and salts thereof with the polyvalent carboxylic acids or phosphinic acids; ammonium salts such as tetramethylammonium hydroxide, tetraethylammonium hydroxide, tetrapropylammonium hydroxide, tetrabutylammonium hydroxide, trimethylethylammonium hydroxide, trimethylpropylammonium hydroxide, trimethylbutylammonium hydroxide, trimethylcetylammonium hydroxide, trioctylmethylammonium hydroxide, tetramethylammonium chloride, tetramethylammonium bromide, tetramethylammonium iodide, tetramethylammonium acetate, and trioctylmethylammonium acetate; phosphines or phosphonium compounds such as triphenylphosphine, tri(toluyl)phosphine, tetraphenylphosphonium bromide, and tetraphenylphosphonium tetraphenyl borate; phenols such as 2,4,6-trisaminomethylphenol; amine adducts; and metal compounds such as carboxylic acid metal salts (zinc salts, tin salts and zirconium salts of 2-ethylhexanoic acid, stearic acid, behenic acid, myristic acid and the like), metal phosphoric acid esters (zinc salts of octylphosphoric acid, stearylphosphoric acid and the like), alkoxy metal salts (tributylaluminum, tetrapropylzirconium and the like), and acetylacetone salts (an acetylacetone-zirconium chelate, an acetylacetone-titanium chelate and the like).

Meanwhile, in regard to the production of the polyvalent carboxylic acid (A-x), if the catalyst used in the epoxy resin composition of the present invention, or any compound that is used as an additive or the like is a compound having a catalytic effect in the current reaction, it is preferable to use such a compound. Specific examples thereof may include a group of compounds that are described as catalysts or additives in the epoxy resin composition that will be described below, and particularly phosphonium salts, ammonium salts and metal compounds are preferable in terms of coloration or change thereof.

In the case of using a catalyst, there are no particular limitations on the amount of use thereof, but it is preferable to use the catalyst usually in an amount of 0.001 parts to 5 parts by mass relative to 100 parts by mass of the total mass of the raw materials, as necessary.

In regard to the present reaction, a solventless reaction is preferred, but it is still acceptable to use an organic solvent. The amount of use of the organic solvent is 0.005 to 1 by mass ratio relative to the total amount of the acid anhydride and the bridged polycyclic diol as reaction substrates, with the total amount being designated as 1, and the amount of use is preferably 0.005 to 0.7, and more preferably 0.005 to 0.5 (that is, 50% by mass or less). If the mass ratio exceeds 1, it is not preferable because the progress of the reaction is extremely slowed. Specific examples of the organic solvent that may be used include alkanes such as hexane, cyclohexane, and heptane; aromatic hydrocarbon compounds such as toluene and xylene; ketones such as methyl ethyl ketone, methyl isobutyl ketone, cyclopentanone, and cyclohexanone; ethers such as diethyl ether, tetrahydrofuran, dioxane, propylene glycol monomethyl ether, and propylene glycol monomethyl ether acetate; and ester compounds such as ethyl acetate, butyl acetate, and methyl formate. In the present invention, since it is particularly preferable to use the epoxy resin composition as a varnish, the solvents used in varnishes, specifically, toluene, xylene, acetone, methyl ethyl ketone, methyl isobutyl ketone, cyclohexanone, cyclopentanone, dimethylformamide, dimethylacetamide, N-methylpyrrolidone, ethyl acetate, butyl acetate, propylene glycol monomethyl ether, propylene glycol monomethyl ether acetate and the like are preferably used. When the epoxy resin composition of the present invention as a varnish, the epoxy resin composition may be used directly after completion of the reaction, without removing the solvent or the like, and therefore, it is preferable in view of productivity.

In regard to the present reaction, the reaction proceeds sufficiently even at a temperature of about 20° C., but in view of the problem with the adjustment of reaction time, the reaction temperature is preferably 30° C. to 150° C., and particularly preferably 40° C. to 120° C. Particularly, in the case of carrying out the present reaction without any solvent, since volatilization of the acid anhydride occurs, it is preferable to carry out the reaction at or below 100° C., and particularly preferably at 30° C. to 100° C. When the reaction temperature is, for example, a high temperature of 150° C. or higher, there is a possibility that the reaction product thus produced may undergo acid anhydrization or the like as a result of dehydration, dealcoholization or the like, and the product molecules may be linked together or undergo ring closure, which is not preferable. Furthermore, there is a possibility of coloration of carboxylic acid, it is preferable to carry out the reaction at a temperature in the range described above.

Regarding the reaction ratio of the acid anhydride and the bridged polycyclic diol, a reaction of the compounds in theoretically equimolar amounts is preferred, but the reaction ratio may be varied as necessary. That is, when the reaction is carried out in an excess of the acid anhydride at the time of production of the polyvalent carboxylic acid (A), a mixture in which the polyvalent carboxylic acid (A) and an excess of the acid anhydride are co-present is obtained at the time point of completion of the reaction. In the present invention, the acid anhydride as a raw material of the polyvalent carboxylic acid (A) may be used in excess, and this excess amount of the acid anhydride may be used directly in the epoxy resin composition of the present invention, for the adjustment of the glass transition point (Tg) of the cured product of the present invention. The glass transition point (Tg) of the cured product of the present invention obtainable when an excess of the acid anhydride is directly used in the epoxy resin composition of the present invention, is higher than the glass transition point (Tg) of the cured product of the present invention obtainable without using an excess of the acid anhydride.

Regarding the specific reaction ratio, the amounts are compared in their functional group equivalents, and when the amount of the acid anhydride is designated as 1 equivalent, the amount of the bridged polycyclic diol is, by molar ratio, preferably 0.001 to 2, more preferably 0.01 to 1.5, and even more preferably 0.01 to 1.1. In the case of leaving the acid anhydride behind, when the viscosity or volatility of the resulting polyvalent carboxylic acid (A), or the glass transition point (Tg) of the cured product described above, the bridged polycyclic diol is preferably used in an amount in the range of 0.01 to 0.7, and more preferably 0.01 to 0.5.

The reaction time may vary with the reaction temperature, the amount of catalyst and the like, but from the viewpoint of industrial production, it is not preferable to carry out the reaction for a long time period because enormous energy may be consumed. Also, an excessively short reaction time means that the reaction should occur very rapidly, and it is not preferable in view of safety. A preferred range of the reaction time is 1 hour to 48 hours, more preferably 1 hour to 36 hours, and even more preferably 1 hour to 24 hours.

When a catalyst has been used, after completion of the reaction, removal of the catalyst is carried out by neutralization, water washing, adsorption or the like, the solvent is distilled off, and thereby the intended polyvalent carboxylic acid (A-x) is obtained. Furthermore, in a reaction without catalyst, the solvent is distilled off as necessary, and also, in the case of a reaction without solvent and without catalyst, the reaction product may be used directly in the epoxy resin composition of the present invention.

When an acid anhydride is used in the epoxy resin composition of the present invention, an acid anhydride may be incorporated into the composition after the reaction between an acid anhydride and a bridged polycyclic diol is carried out at a reaction ratio of theoretically equimolar amounts, or an acid anhydride may be used in excess at the time of production of the polyvalent carboxylic acid (A-x) so that the acid anhydride is left behind. As the acid anhydride that is incorporated after the reaction, an acid anhydride which does not contain an aromatic ring in the structure but has a saturated ring structure is used. Specific examples thereof may include hexahydrophthalic anhydride, methylhexahydrophthalic anhydride, butanetetracarboxylic acid anhydride, bicyclo[2,2,1]heptane-2,3-dicarboxylic acid anhydride, methylbicyclo[2,2,1]heptane-2,3-dicarboxylic acid anhydride, and cyclohexane-1,2,4-tricarboxylic acid-1,2-anhydride. In the present invention, among these acid anhydrides, particularly methylhexahydrophthalic anhydride or cyclohexane-1,2,4-tricarboxylic acid-1,2-anhydride is preferred in view of heat resistance and light resistance. These acid anhydrides that are incorporated may be used in combination of two or more kinds.

As such, the technique of incorporating an acid anhydride in excess and utilizing the surplus acid anhydride in addition to the compound of formula (I), may be similarly applied to the polyvalent carboxylic acid (A-y) that will be described below.

Next, a polyvalent carboxylic acid (A) in which P in formula (I) represents y (hereinafter, for the convenience in explanation, such a carboxylic acid will be referred to as polyvalent carboxylic acid (A-y)) will be described.

In formula (I), the linear alkylene linker represented by P is preferably a moiety containing, as a main chain, an alkylene to which the two alcoholic hydroxyl groups of the diol used as a raw material as will be described below are bonded, the alkylene being substituted with an alkyl group in at least one or more sites, and more preferably being substituted with an alkyl group at two or more sites. There are no particular limitations on the number of carbon atoms of the alkyl group, but an alkyl group having 2 to 10 carbon atoms is preferred. When the linear alkylene linker is substituted at two or more sites, it is preferable that at least one of the substituting alkyl groups have 2 to 10 carbon atoms. The alkyl group may substitute any carbon atom that constitutes the main chain, and for example, the case where the alkyl group substitutes the carbon atom to which an alcoholic hydroxyl group is bonded is also included. Specific examples of such a linear alkylene linker will be described below.

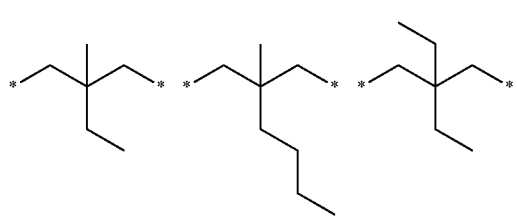

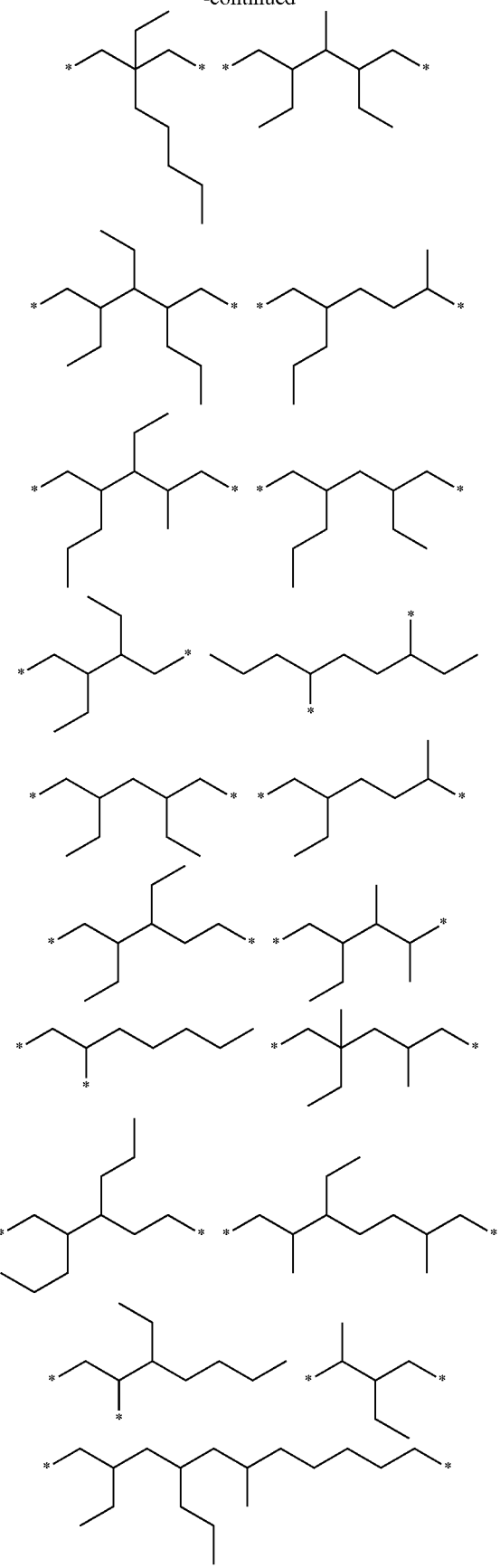

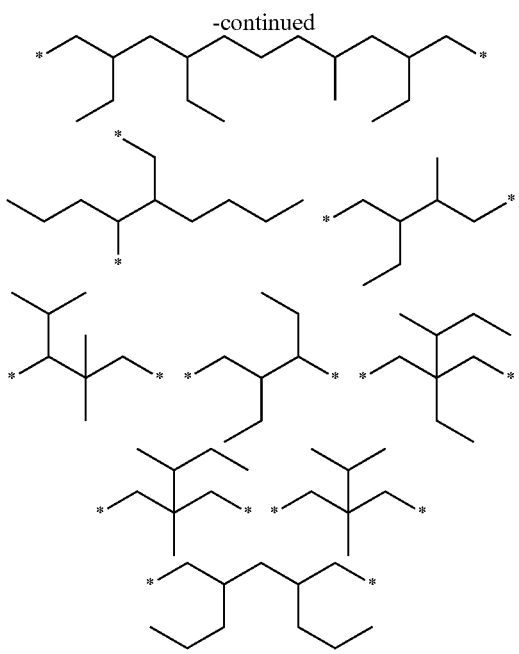

(wherein, in the formulas described above, the linear alkylene linker is bonded to the oxygen atom of formula (I) at the site of symbol *).

The polyvalent carboxylic acid (A-y) is produced by an addition reaction between an acid anhydride and a linear diol compound. The acid anhydride is a polyvalent carboxylic acid anhydride having, in the molecule, one or more cyclohexane structures which may have a substituent. The substituent $R^1$'s that may be carried by the cyclohexane structure each independently represent an alkyl group or a carboxyl group.

Specific examples of the acid anhydride include the same compounds listed in connection with the production of the polyvalent carboxylic acid (A-x).

The linear diol compound is a diol having the linear alkylene linker described above as a backbone structure. Specific examples thereof may include compounds in which symbol * in the specific examples of the linear alkylene linker represents a hydroxyl group. Among such backbone structures, particularly preferred structures include 2,4-diethyl-1,5-pentanediol, 2-ethyl-2-butyl-1,3-propanediol, and 2-ethyl-1,3-hexanediol.

The reaction between the acid anhydride and the linear diol compound is generally an addition reaction catalyzed by an acid or a base, but in the present invention, a reaction without catalyst is particularly preferable. In the case of using a catalyst, examples of the catalyst that may be used include the same compounds as those listed for the production of the polyvalent carboxylic acid (A-x), and among these, triethylamine, pyridine, and dimethylaminopyridine are preferred.

There are no particular limitations on the amount of use of the catalyst, but it is preferable to use the catalyst usually in an amount of 0.001 parts to 5 parts by mass relative to 100 parts by mass of the total mass of the raw materials, as necessary.

When the polyvalent carboxylic acid (A-y) is produced, a linear diol compound may be used instead of the bridged polycyclic diol according to the production method for the polyvalent carboxylic acid (A-x), and the reaction temperature is preferably 40° C. to 200° C., and particularly preferably 40° C. to 150° C. Particularly, when the present reaction is carried out without using a solvent, since volatilization of the acid anhydride may occur, the reaction is preferably carried out at or below 100° C., and the reaction is particularly preferably carried out at 40° C. to 100° C.

Furthermore, regarding the specific reaction ratio between the acid anhydride and the linear diol compound, when the amount is calculated relative to the functional group equivalents, and the amount of the acid anhydride is designated as 1 equivalent, the amount of the linear diol compound is, by molar ratio, preferably 0.001 to 2, more preferably 0.01 to 1.5, and even more preferably 0.01 to 1.1. In the case of leaving the acid anhydride behind, it is preferable to use the acid anhydride at a molar ratio in the range of 0.01 to 0.7, and more preferably 0.01 to 0.5.

When a catalyst has been used, after completion of the reaction, removal of the catalyst is carried out by neutralization, water washing, adsorption or the like, the solvent is distilled off, and thereby the intended polyvalent carboxylic acid (A-y) is obtained.

The most suitable production method is a technique of allowing the acid anhydride and the linear diol compound to react with each other at 40° C. to 150° C. under the conditions without catalyst and without solvent, and after completion of the reaction, extracting the polyvalent carboxylic acid (A-y).

The polyvalent carboxylic acid (A-y) that is used in the present invention and is obtainable in this manner has a structure of formula (I), and usually exhibits a solid resin form that is colorless or pale yellow in color (in some cases, the polyvalent carboxylic acid is crystallized). Furthermore, when the reaction is carried out in an excess amount of the acid anhydride, a liquid polyvalent carboxylic acid is obtained in many cases.

Meanwhile, in the polyvalent carboxylic acids (A-x) and (A-y), when the substituent $R^1$'s in formula (I) are all hydrogen atoms, coloration at the time of curing may be observed, and the polyvalent carboxylic acids are not suitable particularly for severe optical applications. Therefore, it is preferable that at least one of the substituent $R^1$'s be an alkyl group or a carboxyl group. Furthermore, the substituent $R^1$ may be not only any one of an alkyl group and a carboxyl group, but also may be an alkyl group and a carboxyl group. The alkyl group of the substituent $R^1$ have 1 to 15 carbon atoms, and preferably 1 to 6 carbon atoms, and the substituent $R^1$ may have any one of a linear structure, a branched structure and a cyclic structure. Specific examples of the alkyl group for the substituent R1 include a methyl group, an ethyl group, an n-propyl group, an i-propyl group, an n-butyl group, an i-butyl group, and a t-butyl group, and a preferred alkyl group is a methyl group.

In order for the polyvalent carboxylic acids (A-x) and (A-y) having substituents to have their optical characteristics improved to a large extent, a polyvalent carboxylic acid (A) in which at least 50 mol % of all $R^1$'s are substituted by alkyl groups or carboxyl groups, or by alkyl groups and carboxyl groups, is preferred. Even more preferred are polyvalent carboxylic acids (A-x) and (A-y) having 70 mol % or more of $R^1$'s substituted, and most preferred are polyvalent carboxylic acids (A-x) and (A-y) having 90 mol % or more of $R^1$'s substituted. Meanwhile, the substitution ratio of $R^1$'s by alkyl groups or carboxyl groups, or by alkyl groups and carboxyl groups, may be adjusted by the feed amount of the acid anhydride as a raw material for the polyvalent carboxylic acids (A-x) and (A-y). Furthermore, the measurement of the substitution ratio may be achieved by analysis methods that are already known, such as NMR.

Next, a polyvalent carboxylic acid (A) in which P in formula (I) represents z (hereinafter, for the convenience of explanation, such a carboxylic acid will be referred to as polyvalent carboxylic acid (A-z)) will be described.

The polyvalent carboxylic acid (A-z) is obtained by a reaction between an acid anhydride and a bis(dimethylol) dialkyl ether. The bis(dimethylol)dialkyl ether is not particularly limited as long as it is a tetraol compound having an ether bond in the molecule, but specifically, a structure represented by the following formula (IV):

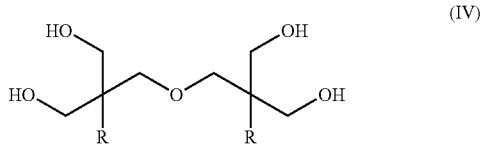

(wherein, R exists in plurality and R's each independently represent a hydrogen atom, an alkyl group having 1 to 15 carbon atoms, or a carboxyl group) is preferred. In the present invention, a structure in which the substituent R represents a linear, branched or cyclic alkyl group having 1 to 15 carbon atoms is preferred, and a structure in which the substituent R represents a linear, branched or cyclic alkyl group having 1 to 6 carbon atoms is particularly preferred. Specific examples thereof may include a methyl group, an ethyl group, an n-propyl group, an isopropyl group, an n-butyl group, a sec-butyl group, and a tert-butyl group, and among them, a methyl group is preferred.

A compound having such a structure may be produced by dimerizing a triol compound which is synthesized by a crossed aldol-Cannizzaro reaction between an aldehyde compound and formaldehyde. Specific examples of the compound include 2,2'-bis(dimethylol)dipropyl ether, 2,2'-bis(dimethylol)diethyl ether, 2,2'-bis(dimethylol)dibutyl ether, 2,2'-bis(dimethylol)dipentyl ether, and 2,2'-bis(dimethylol)dihexyl ether.

The acid anhydride that is preferably used for the production of the polyvalent carboxylic acid (A-z) is a compound represented by the following formula (V):

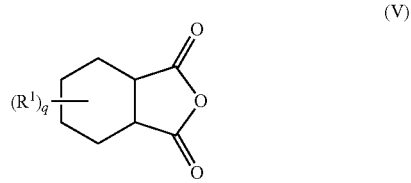

(wherein, $R^1$'s each independently represent a hydrogen atom, an alkyl group having 1 to 15 carbon atoms, preferably an alkyl group having 1 to 6 carbon atoms, or a carboxyl group; and q represents the number of substituent $R^1$'s and represents an integer from 1 to 4). There may be one, or two or more substituent $R^1$'s, and when there are plural $R^1$'s, any one or more of a hydrogen atom, a carboxyl group or an alkyl group having 1 to 15 carbon atoms, or all of a hydrogen atom, a carboxyl group and an alkyl group having 1 to 15 carbon atoms, may be employed. Here, examples of the alkyl group having 1 to 15 carbon atoms include the same ones as the examples of the alkyl group having 1 to 15 carbon atoms listed for the substituent R. The substituent $R^1$ is preferably a carboxyl group or an alkyl group having 1 to 15 carbon atoms. When a carboxyl group is employed as the substituent $R^1$, a compound in which q represents 1 is preferred. When an alkyl group having 1 to 15 carbon atoms is employed as the substituent $R^1$, a compound in which q represents 1 is preferred. Specific examples of the acid anhydride include hexahydrophthalic anhydride, methylhexahydrophthalic anhydride, bicyclo[2,2,1]heptanes-2,3-dicarboxylic acid anhydride, methylbicyclo[2,2,1]-heptane-2,3-dicarboxylic acid anhydride, and cyclohexane-1,3,4-tricarboxylic acid-3,4-anhydride. Among them, 1,3,4-cyclohexanetricarboxylic acid-3,4-anhydride and methylhexahydrophthalic anhydride are preferred. The acid anhydrides may be used singly or as mixtures of two or more kinds.

The reaction between an acid anhydride and a bis(dimethylol)dialkyl ether is generally an addition reaction catalyzed by an acid or a base, but in the present invention, a reaction without catalyst is preferred. In the case of using a catalyst, examples of the catalyst that may be used include the same compounds listed for the production of the polyvalent carboxylic acid (A-x), and among these, triethylamine, pyridine, and dimethylaminopyridine are preferred.

There are no limitations on the amount of use of the catalyst, but it is preferable to use the catalyst usually in an amount of 0.001 parts to 5 parts by mass relative to 100 parts by mass of the total mass of the raw materials, as necessary.

Also in the case of producing the polyvalent carboxylic acid (A-z), a bis(dimethylol)dialkyl ether may be used instead of the bridged polycyclic diol according to the production method for the polyvalent carboxylic acid (A-x) similarly to the case of the polyvalent carboxylic acid (A-y), and the reaction temperature is preferably 40° C. to 200° C., and particularly preferably 40° C. to 150° C. Particularly when the present reaction is carried out without using a solvent, since volatilization of the acid anhydride may occur, the reaction is preferably carried out at or below 100° C., and the reaction is particularly preferably carried out at 40° C. to 100° C.

Regarding the reaction ratio between the acid anhydride and the bis(dimethylol)dialkyl ether, a reaction of the compounds in theoretically equimolar amounts is preferred, but the reaction ratio may be varied as necessary. Regarding the specific reaction ratio, the amounts are compared in their functional group equivalents, and when the amount of the acid anhydride is designated as 1 equivalent, the amount of the bis(dimethylol)dialkyl ether is, by molar ratio, preferably 0.001 to 2, more preferably 0.01 to 1.5, and even more preferably 0.01 to 1.1. In the case of further using another acid anhydride or a liquid carboxylic acid as a curing agent that will be described below, a reaction between the acid anhydride and the bis(dimethylol)dialkyl ether is carried out at a reaction ratio of theoretically equimolar amounts to obtain a polyvalent carboxylic acid (A-z), subsequently the polyvalent carboxylic acid is mixed with another acid anhydride or the liquid carboxylic acid that will be described below, and the mixture is used. The polyvalent carboxylic acid (A-z) is preferably used as a mixture with another curing agent. When the polyvalent carboxylic acid resin (A-z) is obtained in a solid form, it is preferable that the polyvalent carboxylic acid resin (A-z) be mixed with an acid anhydride or a liquid carboxylic acid at a temperature of 150° C. or lower and be compatibilized before use.

When a catalyst has been used, after completion of the reaction, removal of the catalyst is carried out by neutralization, water washing, adsorption or the like, the solvent is distilled off, and thereby the intended polyvalent carboxylic acid (A-z) is obtained. Furthermore, in a reaction without catalyst, the solvent is distilled off as necessary, and also, in the case of a reaction without solvent and without catalyst, the reaction product may be used directly in the epoxy resin composition of the present invention.

The most suitable production method is a technique of allowing the acid anhydride and bis(dimethylol)dialkyl ether to react with each other at 40° C. to 150° C. under the conditions without catalyst and without solvent.

The polyvalent carboxylic acid (A-z) that is obtainable in this manner has a structure of formula (I), and usually exhibits a solid resin form that is colorless or pale yellow in color (in some cases, the polyvalent carboxylic acid is crystallized). Furthermore, when the reaction is carried out in an excess amount of the acid anhydride, a liquid polyvalent carboxylic acid is obtained in many cases.

The epoxy resin of the present invention includes an epoxy resin (B) having an aliphatic cyclic structure in the molecule, in addition to the polyvalent carboxylic acid (A), and the polyvalent carboxylic acid (A) acts as a curing agent for the epoxy resin (B).

When an acid anhydride other than the polyvalent carboxylic acid (A) is used as a curing agent for the epoxy resin in the epoxy resin composition of the present invention, if the total amount of the polyvalent carboxylic acid (A) and the acid anhydride is designated as 100% by mass, the proportion of the polyvalent carboxylic acid (A) is usually 20% to 100% by mass, preferably 20% by to 80% by mass, and more preferably 30% to 75% by mass. As described above, when the acid anhydride is used in excess at the time of production of the polyvalent carboxylic acid (A), it is preferable to adjust the excess amount of the acid anhydride to be in the range described above.

The epoxy resin (B) having an aliphatic cyclic structure in the molecule will be described. Examples of the epoxy resin (B) having an aliphatic cyclic structure in the molecule include terpene diphenol, glycidyl etherification products derived from polycondensates between phenols (phenol, alkyl-substituted phenols, naphthol, alkyl-substituted naphthols, dihydroxybenzene, dihydroxynaphthalene and the like) and aliphatic cyclic structured dienes (dicyclopentadiene, norbornadiene, hexahydroxyindene and the like) and modification products thereof, hydrogenated bisphenol (bisphenol A or bisphenol F) type resins, compounds having a cyclohexyl structure or a dicyclopentadiene structure in the molecule, such as alicyclic epoxy resins, and compounds having a triglycidyl isocyanurate structure. However, in the present invention, it is preferable to use an alicyclic epoxy resin, and a compound which is solid at normal temperature is preferred.

Among them, for the use in the present invention, a compound represented by formula (II) is particularly preferred.

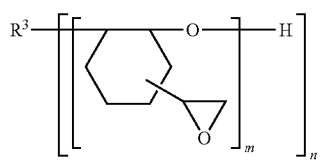

(II)

(wherein, $R^3$ represents an alkoxy group; m represents an average value and represents an integer from 1 to 20; and n represents an integer from 1 to 10).

The carbon chain of the alkoxy group in formula (II) is a linear, branched or cyclic chain having 1 to 20 carbon atoms; preferably a linear, branched or cyclic chain having 1 to 10 carbon atoms; and even more preferably a linear, branched or cyclic chain having 1 to 6 carbon atoms. Specific examples of $R^3$ include residues of monohydric alcohols such as a methoxy group, an epoxy group, an n-propoxy group, an isopropoxy group, an n-butoxy group, a sec-butoxy group, a tert-butoxy group, and an n-hexoxy group; residues of glycols such as ethylene glycol, propylene glycol, and neopentyl glycol; and residues of polyhydric alcohols such as glycerin, trimethylolpropane, trimethylolbutane, trimethylolpentane, pentaerythritol, dipentaerythritol, and ditrimethylolpropane. In formula (II), m represents an average value as discussed above, and represents an integer from 1 to 20, preferably an integer from 1 to 10, and more preferably an integer from 1 to 6. n represents an integer from 1 to 10, and preferably an integer from 1 to 5.

A compound represented by formula (II) is obtained by epoxidizing, through oxidation, a polyolefin obtained by ring-opening polymerization of an alcohol and an epoxy cyclohexane having a vinyl group. Regarding the alcohol that is used as a raw material for the compound represented by formula (II), any of monohydric alcohols and polyhydric alcohols may be used; however, in the present invention, polyhydric alcohols are preferred, and among them, trimethylol alcohols are preferred. Specific examples of the trimethylol alcohols include glycerin, pentaerythritol, trimethylolpropane, trimethylolbutane, and trimethylolpentane. As the compound represented by formula (II), for example, EHPE3150 ($R^3$=trimethylolpropane residue; m=4 to 5; and n=3; manufactured by Daicel Chemical Industries, Ltd.), or EHPE3150CE which is a mixture of EHPE3150 and another component is available in the market.

Next, the aromatic polyfunctional epoxy resin (C) having three or more epoxy groups in the molecule will be described. Examples of the epoxy resin (C) include, among aromatic novolac type epoxy resins, biphenyl type epoxy resins, triphenylmethane type epoxy resins, phenolaralkyl type epoxy resins and the like, epoxy resins each having three or more epoxy groups and an aromatic ring in the molecule.

Specific examples thereof may include epoxides of polyhydric phenols such as tris-(4-hydroxyphenyl)methane and 1,1,2,2-tetrakis(4-hydroxyphenyl)ethane. Further examples include epoxides of polycondensates between phenols (phenol, alkyl-substituted phenols, naphthol, alkyl-substituted naphthols, dihydroxybenzene, dihydroxynaphthalene, and the like) and formaldehyde, acetaldehyde, benzaldehyde, p-hydroxybenzaldehyde, o-hydroxybenzaldehyde, p-hydroxyacetophenone, o-hydroxyacetophenone, 4-(4-hydroxyphenyl)acetophenone, and 4-(1-(4-hydroxyphenyl)-1-methylethyl)acetophenone; and epoxides of polycondensates between phenols and furfural, 4,4'-bis (chloromethyl)-1,1'-biphenyl, 4,4'-bis(methoxymethyl)-1, 1'-biphenyl, 1,4-bis(chloromethyl)benzene, 1,4-bis (methoxymethyl)benzene and the like, which also contain bifunctional epoxy resins in the molecules, and modification products of the polycondensates.

Among these compounds, when transparency, heat resistance, light resistance or hardness of the epoxy resin composition of the present invention is considered, preferred examples of the epoxy resin (C) include tris(4-hydroxyphenyl)methane, 1,1,2,2-tetrakis(4-hydroxyphenyl)ethane, and epoxides of polycondensates between phenols and p-hydroxyacetophenone, 4-(4-hydroxyphenyl)acetophenone, 4-(1-(4-hydroxyphenyl)-1-methylethyl)acetophenone and the like. Meanwhile, when high refractive index, heat resistance and toughness are considered, epoxides of polycondensates between phenols and 4,4'-bis(chloromethyl)-1,1'-biphenyl, 4,4'-bis(methoxymethyl)-1,1'-biphenyl, 1,4-bis(chloromethyl)benzene, 1,4-bis(methoxymethyl)benzene and the like are preferred, and when transparency, heat resistance and hardness are considered, 1,1,2,2-tetrakis(4-hydroxyphenyl)ethane is preferred. These may be used to mutually complement the characteristics of other compositions, and may be appropriately used to achieve a balance between the characteristics of transparency, heat resistance, light resistance and hardness of the cured product of the epoxy resin composition of the present invention.

Furthermore, the epoxy resin (C) that is used in the present invention is more preferably solid at normal temperature. In the present invention, usually, an epoxy resin (C) having a softening point of 50° C. to 100° C. or a melting point of 50° C. to 190° C. is used, but an epoxy resin having a softening point of 60° C. to 100° C. or a melting point of 60° C. to 190° C. is preferred. Also, in the present invention, an epoxy resin having an epoxy equivalent of 130 g/eq. to 500 g/eq. may be usually used, but preferably, an epoxy resin having an epoxy equivalent of 150 g/eq. to 400 g/eq., or more preferably, an epoxy resin having an epoxy equivalent of 170 g/eq. to 300 g/eq. is used. If the epoxy equivalent is too small, there is a strong tendency that the epoxy resin easily becomes hard and brittle. If the epoxy equivalent is too large, there may be a problem that it is difficult to obtain sufficient hardness, and the glass transition point is lowered.

Among them, commercially available examples of the aromatic polyfunctional epoxy resin (C) having three or more epoxy groups in the molecule include TECMORE VG3101L (manufactured by Printec Corp., n≈1.1) and NC-6000 (manufactured by Nippon Kayaku Co., Ltd., n≈1.1), but in the present invention, a compound of formula (III) which is produced by the following production method is preferred.

Examples of the epihalohydrin that is used for the reaction with the phenol compound (PA1) include epichlorohydrin, α-methylepichlorohydrin, γ-methylepichlorohydrin, and epibromohydrin, and epichlorohydrin that is industrially easily available is preferred. The amount of use of the epihalohydrin is usually 2 moles to 15 moles, and preferably 4 moles to 10 moles, relative to 1 mole of the hydroxyl group of the phenol compound (PA1). If an unduly excess amount of epihalohydrin is used, not only productivity is poor, but the softening point of the epoxy resin thus produced is also lowered. Also, when the epoxy resin is used in prepregs, the epoxy resin does not have good influence to tackiness or the like. Furthermore, if the amount of epihalohydrin is 2 moles or less, the value of n becomes large, and the epoxy resin becomes prone to gel during the production.

In the epoxidization reaction described above, an alkali metal hydroxide is preferably used. Examples of the alkali metal hydroxide include sodium hydroxide and potassium hydroxide. Meanwhile, the alkali metal hydroxide may be utilized in a solid form or may be utilized in the form of an aqueous solution thereof. For example, in the case of using the alkali metal hydroxide in the form of an aqueous solution, the epoxidization reaction may be carried out by a method of continuously adding an aqueous solution of the alkali metal hydroxide to the reaction system while, at the same time, distilling water and epihalohydrin continuously under reduced pressure or under normal pressure, partitioning the reaction liquid to remove water, and continuously returning epihalohydrin to the reaction system. Also, in the case of using the alkali metal hydroxide in a solid form, it is preferable to use a flaky material in view of problems such as easy handleability and solubility. The amount of use of the alkali metal hydroxide is usually 0.90 moles to 1.5 moles, preferably 1.01 moles to 1.25 moles, and more preferably

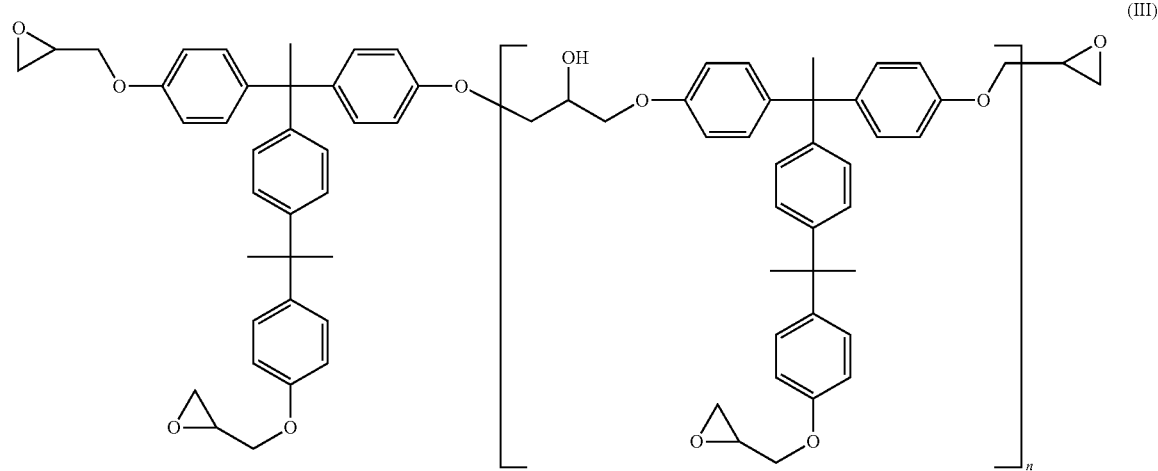

(III)

(wherein, n represents an average value and represents an integer of 1 or 2).

The compound represented by formula (III) is obtained by a reaction between (4-(4-(1,1-bis(p-hydroxyphenyl)-ethyl)-α,α-dimethylbenzyl)phenol) (hereinafter, referred to as phenol compound (PA1)) and epihalohydrin. The phenol compound (PA1) may be produced by, for example, the technique described in JP-A No. 05-64935. Also, the phenol compound is available from Honshu Chemical Industry Co., Ltd. as TRISPHENOL PA.

1.01 moles to 1.15 moles, relative to 1 mole of the hydroxyl group of the phenol compound (PA1).

In regard to the epoxidization reaction, a quaternary ammonium salt such as tetramethylammonium chloride, tetramethylammonium bromide or trimethylbenzylammonium chloride; or a quaternary phosphonium salt such as tetramethylphosphonium chloride, tetramethylphosphonium bromide, trimethylbenzylphosphonium chloride, triphenylbenzylphosphonium chloride or triphenylethyl bromide may be added as a catalyst in order to accelerate the reaction. The amount of use of these quaternary salts is usually 0.1 g to 15 g, and preferably 0.2 g to 10 g, relative to 1 mole of the hydroxyl group of the phenol compound (PA1).

In regard to the epoxidization reaction, it is preferable to carry out the reaction with a solvent added thereto, such as an alcohol such as methanol, ethanol or isopropyl alcohol; an ether such as tetrahydrofuran or dioxane; or an aprotic polar solvent such as dimethylsulfone, dimethyl sulfoxide or dimethylimidazolidinone, in view of the progress of the reaction. In the present invention, particularly from the viewpoint of the optical characteristics, an alcohol and/or an ether is preferably used.

In the case of using the alcohol or the ether, the amount of use thereof is usually 2% to 50% by mass, and preferably 4% to 20% by mass, relative to the amount of use of the epihalohydrin. On the other hand, in the case of using the aprotic polar solvent, the amount of use thereof is usually 5% to 100% by mass, and preferably 10% to 80% by mass, relative to the amount of use of the epihalohydrin.

In the epoxidization reaction, the reaction temperature is usually 30° C. to 90° C., and preferably 35° C. to 80° C. On the other hand, the reaction time is usually 0.5 hours to 10 hours, and preferably 1 hour to 8 hours. The present reaction may be carried out regardless of whether being under normal pressure or under reduced pressure, and the reaction may also be carried out under the conditions of azeotropic dehydration of water-epihalohydrin under reduced pressure. The reaction product of such an epoxidization reaction may be purified by washing with water, or without washing with water, and then removing the epihalohydrin, the solvent or the like by heating under reduced pressure. Furthermore, in order to obtain an epoxy resin containing further less hydrolysable halogen, it is preferable to securely carrying out the ring-closure reaction of the halohydrin which is a side product, by dissolving that the collected reaction product in a solvent such as toluene or methyl isobutyl ketone, adding an aqueous solution of an alkali metal hydroxide such as sodium hydroxide or potassium hydroxide, and performing a ring-closure reaction of the side product.

In this case, the amount of use of the alkali metal hydroxide is usually 0.01 moles to 0.3 moles, and preferably 0.05 moles to 0.2 moles, relative to 1 mole of the hydroxyl group of the phenol compound (PA1) used for epoxidization. Furthermore, the reaction temperature is usually 50° C. to 120° C., and the reaction time is usually 0.5 hours to 2 hours.

In regard to the epoxidization reaction, an epoxy resin that may be used in the present invention may be obtained by removing, after completion of the reaction, the salt produced in the reaction by filtration, water washing or the like, and further distilling off the solvent by heating under reduced pressure. The epoxy resin obtained in this manner also includes partial addition products of the epoxy resin by means of the solvent or water, or residual halogen that has not be used up for the ring-closure.

Any epoxy resin obtainable in this manner is not particularly limited, but according to the present invention, it is preferable that the epoxy resin satisfy any of the following conditions that impart excellent productivity and handleability and provide high mechanical strength to the cured product.

1. The epoxy equivalent is 195 g/eq. to 225 g/eq., and preferably 200 g/eq. to 220 g/eq.
2. In gel permeation chromatography, the fraction of a product in which two molecules of the phenol compound (PA1) are linked by an epihalohydrin is 20% by area or less, and the fraction of a product in which three molecules are linked is 15% by area or less. More preferably, the fraction of a product in which two molecules are linked is 15% by area or less, and the fraction of a product in which three molecules are linked is 10% by area or less.

Furthermore, in addition to the epoxy resin (B) having an aliphatic cyclic structure and the aromatic polyfunctional epoxy resin (C) having three or more epoxy groups in the molecule, an epoxy resin (D) may be used singly, or two or more kinds thereof may be used as a mixture, in view of the viscosity, adhesiveness, glass transition temperature (Tg), hardness, refractive index and the like of the epoxy resin composition of the present invention thus obtainable.

Examples of the epoxy resin (D) include aromatic epoxy resins each having fewer than three epoxy groups in the molecule, bisphenol type epoxy resins, and non-aromatic epoxy resins, which are different from the epoxy resin (B) and the epoxy resin (C) described above.

Specific examples thereof may include, but not limited to, solid or liquid epoxy resins such as bisphenol A, bisphenol F, bisphenol S, thiodiphenol, fluorenebisphenol, 4,4'-biphenol, 2,2'-biphenol, 3,3',5,5'-tetramethyl-[1,1'-biphenyl]-4,4'-diol, hydroquinone, resorcin, naphthalenediol; bifunctional forms of polycondensates between phenols (phenol, alkyl-substituted phenols, naphthol, and alkyl-substituted naphthols) and formaldehyde, acetaldehyde, benzaldehyde, furfural, 4,4'-bis(chloromethyl)-1,1'-biphenyl, 4,4'-bis(methoxymethyl)-1,1'-biphenyl, 1,4-bis(chloromethyl)benzene, 1,4-bis(methoxymethyl)benzene and the like; halogenated bisphenols such as tetrabromobisphenol A; glycidyl etherification products derived from alcohols; glycidylamine-based epoxy resins, glycidyl ester-based epoxy resins, and silsesquioxane-based epoxy resins (epoxy resins having a glycidyl group and/or an epoxycyclohexane structure in a siloxane structure which is linear, cyclic, ladder-shaped, or a mixture of at least two or more of the linear, cyclic and ladder-shaped structures).

In the epoxy resin composition of the present invention, another curing agent may be used in combination as necessary, in addition to the polyvalent carboxylic acid (A). Examples of the other curing agent that may be used in combination may include amine-based compounds, acid anhydride-based compounds having an unsaturated ring structure, amide-based compounds, phenolic compounds, and carboxylic acid-based compounds. Specific examples of the curing agent that may be used may include, but not limited to, diaminodiphenylmethane, diethylenetriamine, triethylenetetramine, diaminodiphenylsulfone, isophoronediamine, dicyandiamide, a polyamide resin synthesized from a dimer of rinolenic acid and ethylenediamine, phthalic anhydride, trimellitic anhydride, pyromellitic anhydride, maleic anhydride, tetrahydrophthalic anhydride, methyltetrahydrophthalic anhydride, methylnadic anhydride, nadic anhydride, hexahydrophthalic anhydride, methylhexahydrophthalic anhydride, butanetetracarboxylic acid anhydride, bicyclo[2,2,1]-heptane-2,3-dicarboxylic acid anhydride, methylbicyclo[2,2,1]heptanes-2,3-dicarboxylic acid anhydride, cyclohexane-1,3,4-tricarboxylic acid-3,4-anhydride, bisphenol A, bisphenol F, bisphenol S, fluorenebisphenol, terpenediphenol, 4,4'-biphenol, 2,2'-biphenol, 3,3',5,5'-tetramethyl-[1,1'-biphenyl]-4,4'-diol, hydroquinone, resorcin, naphthalenediol, tris(4-hydroxyphenyl)methane, 1,1,2,2-tetrakis(4-hydroxyphenyl)ethane; polycondensates between phenols (phenol, alkyl-substituted phenols, naphthol, alkyl-substituted naphthols, dihydroxybenzene, dihydroxynaphthalene and the like) and formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis (chloromethyl)-1,1'-biphenyl, 4,4'-bis(methoxymethyl)-1,1'-biphenyl, 1,4'-bis(chloromethyl)benzene, 1,4'-bis(methoxymethyl)benzene and the like, and modification products thereof; halogenated bisphenols such as tetrabromobisphenol A; imidazole, trifluoroborane-amine complexes, guanidine derivatives, and condensates of terpene and phenols. These may be used singly, or two or more kinds may be used together.

In the epoxy resin composition of the present invention, the use ratio of the various components is such that the proportion of the component (A) (a carboxylic acid is considered to be monofunctional, and an acid anhydride is considered as monofunctional) is preferably 0.5 equivalents to 1.5 equivalents, and particularly preferably 0.5 equivalents to 1.2 equivalents, relative to 1 equivalent of epoxy groups of all the epoxy resins of component (B)+component (C)+component (D). If the proportion of the component (A) is less than 0.5 equivalents relative to 1 equivalent of epoxy groups, or if the proportion is greater than 1.5 equivalents, there is a risk in both cases that curing may be incomplete, and satisfactory curing properties may not be obtained.

Furthermore, the use proportions of the various components in all the epoxy resins may be determined while taking into consideration of the refractive index, glass transition temperature, hardness, adhesiveness or the like that are desired; however, when the amount of component (B)+component (C)+component (D) is designated as 100 parts by mass, the content of the component (B) is 5 parts to 100 parts by mass, and particularly preferably 10 parts to 90 parts by mass. The content of the component (C) is 0 parts to 70 parts by mass, and particularly preferably 5 parts to 50 parts by mass. The content of the component (D) is 0 parts to 70 parts by mass, and particularly preferably 10 parts to 50 parts by mass. Furthermore, the mixture of all the epoxy resins of component (B)+component (C)+component (D) is preferably solid at normal temperature. The proportion of components that are used in a liquid form at normal temperature among the components (B), (C) and (D) is preferably 30 parts by mass or less relative to 100 parts by mass of all the epoxy resins.

Furthermore, in the case of using the polyvalent carboxylic acid (A-z), an acid anhydride or a liquid carboxylic acid may be preferably selected as another curing agent. The acid anhydride in this case is preferably an acid anhydride which does not have an aromatic ring in the structure but has a saturated ring structure, and among others, those acid anhydrides that are used as a raw material of the polyvalent carboxylic acid (A-z) are preferred. Specific examples thereof include hexahydrophthalic anhydride, methylhexahydrophthalic anhydride, butanetetracarboxylic acid anhydride, bicyclo[2,2,1]heptanes-2,3-dicarboxylic acid anhydride, methylbicyclo[2,2,1]heptanes-2,3-dicarboxylic acid anhydride, and cyclohexane-1,3,4-tricarboxylic acid-3,4-anhydride. Among these acid anhydrides, in the present invention, methylhexahydrophthalic anhydride or cyclohexane-1,3,4-tricarboxylic acid-3,4-anhydride in particular is preferred when heat resistance and light resistance are considered. These acid anhydrides may also be used as mixtures of two or more kinds.

Furthermore, the liquid carboxylic acid is a bifunctional or higher-functional carboxylic acid, and is a polyvalent carboxylic acid which is liquid having a viscosity of 1000 Pa·s or less at 25° C. Specifically, a reaction product between the acid anhydride that is used as a raw material of the polyvalent carboxylic acid (A), and a carbinol-modified silicon compound is preferred. Examples of the carbinol-modified silicon compound may be synthesized by using, for example, the technique described in Japanese Patent Application Laid-Open No. 2007-508424 or the like. Examples of compounds that are available from the market may include Dow Corning 5562 (manufactured by Dow Corning Toray Co., Ltd.), X22-160-AS, KF-6001, KF-6002, KF-6003 (all manufactured by Shin-Etsu Chemical Co., Ltd.), XF42-B0970 (manufactured by Momentive Performance Materials, Inc.), and SILAPLANE FM-4411, FM-4421 and FM-4425. In the present invention, a compound having a weight average molecular weight of 500 to 10,000 is particularly preferred, and more preferred is a compound having a weight average molecular weight of 600 to 6,000, while particularly preferred is a compound having a weight average molecular weight of 600 to 2,000. Also, the most preferred range of the weight average molecular weight is 600 to 1,500.

In regard to the epoxy resin composition of the present invention, in the case of using an acid anhydride or a liquid carboxylic acid, when the total amount of the polyvalent carboxylic acid (A-z) and the acid anhydride or liquid carboxylic acid is designated as 100% by mass, the proportion of the polyvalent carboxylic acid (A-z) is usually 20% to 100% by mass, preferably 20% to 80% by mass, and more preferably 30% to 75% by mass.

In the epoxy resin composition of the present invention, a curing accelerator may be used in combination with a curing agent. Specific examples of the curing accelerator that may be used may include various imidazoles such as 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl, 4-methlyimidazole (1'))ethyl-s-triazine, a 2,4-diamino-6(2'-methylimidazole(1'))ethyl-s-triazine isocyanuric acid adduct, a 2:3 adduct of 2-methylimidazole isocyanuric acid, a 2-phenylimidazole isocyanuric acid adduct, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole; salts of those imidazoles and polyvalent carboxylic acids such as phthalic acid, isophthalic acid, terephthalic acid, trimellitic acid, pyromellitic acid, naphthalenedicarboxylic acid, maleic acid, and oxalic acid; amides such as dicyandiamide; diaza compounds such as 1,8-diazabicyclo(5.4.0)undecene-7, and salts thereof with tetraphenyl borate, phenol-novolac and the like; salts of the diaza compounds with the polyvalent carboxylic acids or phosphinic acids; ammonium salts such as tetrabutylammonium bromide, cetyltrimethylammonium bromide, and trioctylmethylammonium bromide; phosphines or phosphonium compounds such as triphenylphosphine, tri(toluyl)phosphine, tetraphenylphosphonium bromide, and tetraphenylphosphonium tetraphenyl borate; phenols such as 2,4,6-trisaminomethylphenol; amine adducts; metal compounds such as tin octoate; and microcapsule type curing accelerators obtained by microencapsulating these curing accelerators. In regard to the question of which of these curing accelerators should be used, the curing accelerator is appropriately selected on the basis of, for example, the characteristics required from a transparent resin composition, such as transparency, curing rate, and the operating conditions. The curing accelerator is usually used in an amount in the range of 0.001 parts to 15 parts by mass relative to 100 parts by mass of all the epoxy resins in the epoxy resin composition of the present invention.

In the applications of the present invention, when transparency, heat resistance, light resistance, curing rate and the like are considered, it is preferable not to use a catalyst, or to use diaza compounds such as 1,8-diazabicyclo(5.4.0)undecene-7 and salts thereof; or phosphines or phosphonium compounds such as triphenylphosphine, tri(toluyl)phosphine, tetraphenylphosphonium bromide, and tetraphenylphosphonium tetraphenyl borate.

In the curable resin composition of the present invention, a phosphorus-containing compound may be incorporated as a flame retardancy imparting component. The phosphorus-containing compound may be a reactive type compound or may be an additive type compound. Specific examples of the phosphorus-containing compound include phosphoric acid esters such as trimethyl phosphate, triethyl phosphate, tricresyl phosphate, trixylylenyl phosphate, cresyldiphenyl phosphate, cresyl-2,6-dixylylenyl phosphate, 1,3-phenylenebis(dixylylenyl phosphate), 1,4-phenylenebis(dixylylenyl phosphate), and 4,4'-biphenyl(dixylylenyl phosphate); phosphanes such as 9,10-dihydro-9-oxa-10-phosphaphenanthrene-10-oxide and 10-(2,5-dihydroxyphenyl)-10H-9-oxa-10-phosphaphenanthrene-10-oxide; phosphorus-containing epoxy compounds obtained by causing epoxy resins to react with active hydrogens of the aforementioned phosphanes; and red phosphorus. However, phosphoric acid esters, phosphanes and phosphorus-containing epoxy compounds are preferred, while 1,3-phenylenebis(dixylylenyl phosphate), 1,4-phenylenebis(dixylylenyl phosphate), 4,4'-biphenyl(dixylylenyl phosphate), and phosphorus-containing epoxy compounds are particularly preferred. In the case of imparting flame retardancy, the amount of use of the phosphorus-containing compound is preferably such that the ratio of the phosphorus-containing compound/all epoxy resins=0.1 to 0.6 (mass ratio). If the ratio is 0.1 or less, flame retardancy is insufficient, and if the ratio is 0.6 or more, there is a risk that there may be adverse effects on the hygroscopic property and dielectric properties of the cured product.

Furthermore, in the epoxy resin composition of the present invention, an oxidation inhibitor may also be added as necessary. Examples of the oxidation inhibitor that may be used include phenol-based, sulfur-based and phosphorus-based oxidation inhibitors.

Specific examples of the phenol-based oxidation inhibitors include monophenols such as 2,6-di-t-butyl-p-cresol, butylated hydroxyanisole, 2,6-di-t-butyl-p-ethylphenol, stearyl-β-(3,5-di-t-butyl-4-hydroxyphenyl) propionate, isooctyl-3-(3,5-di-t-butyl-4-hydroxyphenyl) propionate, 2,4-bis(n-octylthio)-6-(4-hydroxy-3,5-di-t-butylanilino)-1,3,5-triazine, and 2,4-bis[(octylthio)methyl]-o-cresol; bisphenols such as 2,2'-methylenebis(4-methyl-6-t-butylphenol), 2,2'-methylenebis(4-ethyl-6-t-butylphenol), 4,4'-thiobis(3-methyl-6-t-butylphenyl), 4,4'-butylidenebis(3-methyl-6-t-butylphenol), triethylene glycol-bis[3-(3-t-butyl-5-methyl-4-hydroxyphenyl) propionate], 1,6-hexanediol-bis[3-(3,5-di-t-butyl-4-hydroxyphenyl) propionate], N,N'-hexamethylenebis(3,5-di-t-butyl-4-hydroxyhydrocinnamide), 2,2-thiodiethylenebis[3-(3,5-di-t-butyl-4-hydroxyphenyl) propionate], 3,5-di-t-butyl-4-hydroxybenzyl phosphonate diethyl ester, 3,9-bis[1,1-dimethyl-2-{β-(3-t-butyl-4-hydroxy-5-methylphenyl)propionyloxy}ethyl]-2,4,8,10-tetraoxaspiro[5,5]undecane, and bis(ethyl 3,5-di-t-butyl-4-hydroxybenzylsulfonate) calcium; and polymer type phenols such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl) propionate]methane, bis[3,3'-bis(4'-hydroxy-3'-t-butylphenyl)butyric acid]glycol ester, tris-(3,5-di-t-butyl-4-hydroxybenzyl)-isocyanurate, 1,3,5-tris(3',5'-di-t-butyl-4'-hydroxybenzyl)-S-triazine-2,4,6-(1H,3H,5H)trione, and tocophenol.

Specific examples of the sulfur-based oxidation inhibitors include dilauryl-3,3'-thiodipropionate, dimyristyl-3,3'-thiodipropionate, and distearyl-3,3'-thiodipropionate.

Specific examples of the phosphorus-based oxidation inhibitors include phosphites such as triphenyl phosphite, diphenylisodecyl phosphite, phenyldiisodecyl phosphite, tris(nonylphenyl)phosphite, diisodecylpentaerythritol phosphite, tris(2,4-di-t-butylphenyl)phosphite, cyclic neopentanetetraylbis(octadecyl)phosphite, cyclic neopentanetetraylbis(2,4-di-t-butylphenyl)phosphite, cyclic neopentanetetraylbis(2,4-di-t-butyl-4-methylphenyl)phosphite, and bis[2-t-butyl-6-methyl-4-{2-(octadecyloxycarbonyl)ethyl}phenyl]hydrogen phosphite; and oxaphosphaphenanthrene oxides such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide.

These oxidation inhibitors may be each used alone, but two or more kinds may also be used in combination. The amount of use of the oxidation inhibitor is usually 0.008 parts to 1 part by mass, and preferably 0.01 parts to 0.5 parts by mass, relative to 100 parts by mass of the epoxy resin composition of the present invention. Furthermore, according to the present invention, phosphorus-based oxidation inhibitors are preferred.

Furthermore, in the epoxy resin composition of the present invention, a photostabilizer may also be added as necessary. The photostabilizer is suitably a hindered amine-based photostabilizer, particularly HALS or the like. There are no particular limitations on HALS, but representative examples thereof include a polycondensate of dibutylamine/1,3,5-triazine/N,N'-bis(2,2,6,6-tetramethyl-4-piperidyl-1,6-hexamethylenediamine and N-(2,2,6,6-tetramethyl-4-piperidiyl)butylamine; a succinic acid dimethyl-1-(2-hydroxyethyl)-4-hydroxy-2,2,6,6-tetramethylpiperidine polycondensate (for example, TINUVIN 111FDL, a component manufactured by Ciba Geigy Japan, Ltd.), poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] (for example, TINUVIN 111FDL, a component manufactured by Ciba Geigy Japan, Ltd.), bis(1,2,2,6,6-pentamethyl-4-piperidyl)[[3,5-bis(1,1-dimethylethyl)-4-hydroxyphenyl]methyl]butylmalonate (for example, TINUVIN 144, manufactured by Ciba Geigy Japan, Ltd.), bis(2,2,6,6-tetramethyl-4-piperidyl) sebacate (for example, TINUVIN 292, a component manufactured by Ciba Geigy Japan, Ltd.), bis(1,2,2,6,6-pentamethyl-4-piperidyl) sebacate (for example, TINUVIN 292, a component manufactured by Ciba Geigy Japan, Ltd.), bis(1-octyloxy-2,2,6,6-tetramethyl-4-piperidyl) sebacate (for example, TINUVIN 123, a component manufactured by Ciba Geigy Japan, Ltd.), and bis(1,2,2,6,6-pentamethyl-4-piperidyl) 2-(3,5-di-t-butyl-4-hydroxybenzyl)-2-n-butylmalonate. The photostabilizers may be used singly, or two or more kinds may be used in combination.

Furthermore, in the epoxy resin composition of the present invention, an ultraviolet absorber may also be added as necessary. There are no particular limitations on the ultraviolet absorber, but examples thereof include benzotriazole-based and hydroxyphenyltriazine-based compounds, and these may be used in combination with the photostabilizers previously described.

Examples of the benzotriazole-based (so-called BTZ-based) ultraviolet absorbers include benzotriazoles such as 2-(2-hydroxy-5-t-butylphenyl)-2H-benzotriazole (for example, TINUVIN PS, manufactured by Ciba Geigy Japan, Ltd.), benzenepropanoic acid 3-(2H-benzotriazol-2-yl)-5-(1,1-dimethylethyl)-4-hydroxyalkyl ester (for example, TINUVIN 99-2, manufactured by Ciba Geigy Japan, Ltd.), benzenepropanoic acid-3-(2H-benzotriazol-2-yl)-5-(1,1-dimethylethyl)-4-hydroxyalkyl ester (for example, TINUVIN 384-2, manufactured by Ciba Geigy Japan, Ltd.), 2-(2H-benzotriazol-2-yl)-4,6-bis(1-methyl-1-phenylethyl)phenol (for example, TINUVIN 900, manufactured by Ciba Geigy Japan, Ltd.), 2-(2H-benzotriazol-2-yl)-6-(1-methyl-1-phenylethyl)-4-(1,1,3,3-tetramethylbutyl)phenol (for example, TINUVIN 928, manufactured by Ciba Geigy Japan, Ltd.), and a reaction product of methyl 3-(3-(2H-benzotriazol-2-yl)-5-t-butyl-4-hydroxyphenyl)propionate/polyethylene glycol (for example, TINUVIN 1130, manufactured by Ciba Geigy Japan, Ltd.).

Examples of the hydroxyphenyltriazine-based (so-called HPT-based) ultraviolet absorbers include compounds having a structure represented by the following formula:

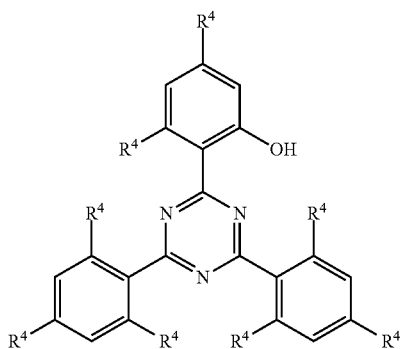

(wherein, $R^4$ exists in plurality, and $R^4$'s each independently represent a hydrogen atom, an aliphatic or aromatic hydrocarbon group having 1 to 12 carbon atoms, a (poly)alkyleneoxy group having 1 to 4 carbon atoms, or —O—$R^5$; and $R^5$ represents a hydrogen atom, a hydrocarbon group having 1 to 12 carbon atoms, or a reaction residue between a hydrogen atom and another glycidyl ether group-, carboxyl group-, or acrylate group-containing compound).

Examples of the HPT-based ultraviolet absorbers include hydroxyphenyltriazines such as a reaction product of 2-(4,6-bis(2,4-dimethylphenyl)-1,3,5-triazin-2-yl)-5-hydroxyphenyl and oxirane[(alkyloxy)methyl]oxirane (for example, TINUVIN 400, manufactured by Ciba Geigy Japan, Ltd.), a reaction product of 2-(2,4-dihydroxyphenyl)-4,6-bis(2,4-dimethylphenyl)-2,3,5-triazine and (2-ethylhexyl)glycidic acid ester (for example, TINUVIN 405, manufactured by Ciba Geigy Japan, Ltd.), 2,4-bis[2-hydroxy-4-butoxyphenyl]-6-(2,4-dibutoxyphenyl)-1,3,5-triazine (for example, TINUVIN 460, manufactured by Ciba Geigy Japan, Ltd.), and propanoic acid-2-[4-[4,6-bis([1,1'-biphenyl]-4-yl)-1,3,5-traizin-2-yl]-3-hydroxyphenyl-, isooctyl ester (for example, TINUVIN 479, manufactured by Ciba Geigy Japan, Ltd.). Among these, hydrophenyltriazines having excellent colorability over time are suitably used.

Particularly, compounds in which at least one of R4's is an aromatic hydrocarbon, such as propanoic acid-2-[4-[4,6-bis([1,1'-biphenyl]-4-yl)-1,3,5-triazin-2-yl]-3-hydroxyphenyl]-isooctyl ester (for example, TINUVIN 479, manufactured by Ciba Geigy Japan, Ltd.), exhibit excellent efficacy.

Among these, when the epoxy resin composition comprises a hydroxyphenyltriazine-based (so-called HPT-based) ultraviolet absorber and a hindered amine-based photostabilizer in combination, it is more preferable because light resistance is further enhanced.

Furthermore, in the epoxy resin composition of the present invention, resin components such as a butyral-based resin, an acetal-based resin, an acrylic resin, an epoxy-nylon-based resin, an NBR-phenolic resin, an epoxy-NBR-based resin, a polyamide-based resin, a polyimide-based resin, and a silicone-based resin may also be added as necessary, to the extent that characteristics such as transparency and hardness are not impaired.

Furthermore, in the epoxy resin composition of the present invention, fine particles having a primary particle size of 1 to 200 nanometers may also be added. Examples of the fine particles include fine particles of glass, silica, zirconium oxide, tin oxide, titanium oxide, zinc oxide, indium tin oxide, antimony oxide, selenium oxide, and yttrium oxide, and these fine particles may be purchased for use from the market as fine powders which do not contain a dispersing solvent, or as colloidal solutions having the fine particles dispersed in a solvent. Furthermore, one kind of these particles may be used singly, or two or more kinds may be used as mixtures. Regarding the dispersing solvent, solvents capable of dissolving the various components of the epoxy resin composition of the present invention, such as ketones such as methyl ethyl ketone, methyl isobutyl ketone, cyclohexanone, and dimethyldimethylacetamide; esters such as ethyl acetate and butyl acetate; and non-polar solvents such as toluene and xylene, may be selected and used.

In addition to them, a silane coupling agent, a mold releasing agent, a leveling agent, a surfactant, a dye, a pigment, an inorganic or organic light diffusing filler, and the like may also be added.

According to the present invention, it is preferable to add a metal salt for the purpose of improving the heat resistance and light resistance characteristics. Specific examples thereof include metal compounds such as carboxylic acid metal salts (zinc salts, tin salts and zirconium salts of 2-ethylhexanoic acid, stearic acid, behenic acid, myristic acid and the like), phosphoric acid ester metals (zinc salts of octylphosphoric acid, stearylphosphoric acid and the like), alkoxy metal salts (tributylaluminum, tetrapropylzirconium and the like), and acetylacetone salts (acetylacetone-zirconium chelate, acetylacetone-titanium chelate, and the like). These may be used singly, or two or more kinds thereof may be used.

The epoxy resin composition of the present invention may be converted to a cured product by uniformly mixing various components by a method similar to those conventionally known methods. For example, an epoxy resin, a polyvalent carboxylic acid curing agent, and optionally a curing accelerator and other components are sufficiently mixed until the mixture becomes uniform, by using an extruder, a kneader, a roll or the like as necessary, and thus the epoxy resin composition of the present invention is obtained. Since the epoxy resin composition of the present invention is solid at normal temperature, use may be made of a technique melting the resin composition, subsequently molding the molten composition by using a mold, a transfer molding machine or the like, and curing the molding product by further heating.

The epoxy resin composition of the present invention may be diluted in solvents such as toluene, xylene, acetone, methyl ethyl ketone, methyl isobutyl ketone, cyclohexanone, cyclopentanone, dimethylformamide, dimethylacetamide, N-methylpyrrolidone, ethyl acetate, butyl acetate, propylene glycol monomethyl ether, and propylene glycol monomethyl ether acetate, and the dilution may be used as a varnish. Since the epoxy resin composition of the present invention is usually solid at normal temperature, it is easier and more preferable, from the viewpoint of handleability, to use the composition after diluting it in a solvent. Particularly, in the case of using the epoxy resin composition by impregnating a glass cloth with the composition, dilution with a solvent is implemented.

The solvents may be used singly or as solvent mixtures of two or more kinds, in consideration of the viscosity, drying speed and the like at the time of use of the epoxy resin composition of the present invention. The use proportion of the solvent may vary depending on the workability at the time of use or the drying speed, but the use proportion is usually 10 parts to 200 parts by mass, and preferably 15 parts to 100 parts by mass, relative to 100 parts by mass of the epoxy resin composition of the present invention.

Also in the case of obtaining the epoxy resin composition that is diluted in a solvent, the dilution may be prepared by mixing and dissolving various components according to a routine method. For example, when various components are introduced into a round-bottom flask equipped with a stirring device and a thermometer, and the mixture is stirred for 0.5 hours to 6 hours at 40° C. to 80° C., a varnish of the epoxy resin composition may be obtained. At this time, a method of separately preparing a varnish of the epoxy resins of component (B)+component (C)+component (D) and a varnish of component (A)+a curing catalyst or additives and mixing the two at the time of use, is particularly preferred. As previously described, in the case of adding fine particles, the varnish may be treated by a generally known dispersing method using a high-speed stirrer such as a homomixer or a sand mill, a microfluidizer, a three-roll, or the like.

A varnish of the epoxy resin composition of the present invention obtained in this manner is molded by a known method, dried, and then cured by further heating. For example, a method of pouring the varnish into a mold, heating and drying the varnish, and then curing the varnish; a method of applying the varnish on a metal plate, a release film or the like, which replaces a mold, by a method that is known per se, such as a bar coater, an air knife coater, a die coater, a gravure coater, offset printing, flexographic printing, or screen printing, heating and drying the varnish, and then curing the varnish; a method of impregnating a glass cloth with the varnish, heating and drying the varnish, and then curing the varnish; and a method of using the varnish as a coating agent, by applying the varnish on a glass base material or a transparent plastic base material, heating and drying the varnish, and then curing the varnish to use the cured product together with the base material, may be used. Since the epoxy resin composition of the present invention does not undergo a change in the refractive index, which results from volatilization of the curing agent at the time of curing and consequent change in the component ratio of the film, a stable transparent film may be obtained. Accordingly, the epoxy resin composition is appropriate for the production of optical sheets that will be described below. Furthermore, there is neither roughening of the surface of the cured film, nor any change in the properties of the cured film, caused by volatilization of the curing agent, and a smooth film having excellent hardness may be obtained.

The drying temperature of the varnish of the epoxy resin composition of the present invention may vary with the solvent used or the amount of air blow, but the drying temperature is usually preferably 60° C. to 200° C. When the varnish is used to impregnate a glass fiber sheet-like base material such as a glass cloth, and the solvent is dried, a prepreg may be obtained by bringing the epoxy resin composition of the present invention to a semicured state. There are no particular limitations on the drying conditions in this case, but the temperature is preferably 100° C. to 180° C., and the time is preferably 1 minute to 30 minutes.

A cured product obtainable by curing the epoxy resin composition of the present invention is also included in the present invention. A cured product obtainable by producing a prepreg in which a glass cloth is impregnated with the epoxy resin composition of the present invention, and then drying and curing the prepreg (optical sheet) is also similarly included in the present invention. As discussed above, since the epoxy resin composition of the present invention does not undergo a change in the refractive index as a result of volatilization of the curing agent at the time of curing, the epoxy resin composition is adequate for the production of the optical sheet. Meanwhile, the curing temperature and time for the epoxy resin composition of the present invention is 80° C. to 200° C. and 2 hours to 200 hours. Regarding the curing method, the epoxy resin composition may be cured all at once at a high temperature, but may also be cured for a long time at a low temperature of 150° C. or lower. The curing reaction may also be carried out by increasing the temperature stepwise by performing initial curing at a temperature between 80° C. and 150° C., and performing post-cure at a temperature between 100° C. and 200° C., or the like.

Regarding the glass cloth for producing the prepreg, commercially available products that are known may be used. Among them, E glass that is generally used for resin reinforcement has less alkali metal oxide and is suitable for the applications of the present invention as alkali-free glass. There are various commercially available glass clothes, such as woven fabrics, non-woven fabrics, and knits produced by using glass fibers, and there are no particular limitations on the kind of the glass cloth in the present invention. However, in order to obtain a smooth cured product when the epoxy resin composition of the present invention is impregnated and cured, a glass cloth having smaller surface unevenness is suitable. When the conditions for drying and semicuring for the production of a prepreg are considered, the thickness of the glass cloth is usually 100 μm or less, and preferably 50 μm or less. A glass cloth having a thickness of about 25 μm or less is used to produce a prepreg, two sheets to several sheets are superimposed to be integrated at the time of curing, and the resultant may be used as the optical sheet of the present invention. Regarding the diameter of the glass fiber used in the glass cloth, a smaller diameter is more desirable in view of transparency or the like, and a diameter of 10 μm or less is preferred. Furthermore, when the adhesiveness to the epoxy resin composition of the present invention is considered, the glass fiber is preferably treated with a silane coupling agent. The refractive index is 1.51 to 1.57, and a generally available glass fiber having a refractive index of 1.55 to 1.57 is more preferred.

According to the present invention, it is preferable that the refractive index of the cured product of the present invention differ by a small degree from the refractive index of the glass cloth used. Specifically, the difference between the refractive index of the cured product and the refractive index of the glass cloth is preferably ±0.01, and the difference is more preferably ±0.005. If the refractive index of the cured product of the present invention is in this range, an optical sheet of the present invention having excellent transparency, smoothness and hardness is obtained. Optical sheets having superior transparency and smoothness may also be obtained by further applying the epoxy resin composition of the present invention on these optical sheets, and drying and curing the epoxy resin composition.

The optical sheet of the present invention may be used as a substitute for glass that is used in liquid crystal displays, plasma displays, EL displays, display devices of portable equipment, solar cells and the like. In addition to that, the optical sheet may also be used in peripheral materials for liquid crystal display devices, such as films for liquid crystal applications such as a light waveguide, a prism sheet, a polarizing plate, a retardation plate, a viewing angle correction film, an adhesive, or a polarizer protective film; an anti-reflection film, a front plate for touch panels, an optical correction film, and the like.

EXAMPLES

Next, the present invention will be described in more detail by way of Examples. Meanwhile, the present invention is not intended to be limited by the following Examples. In Synthesis Examples x2 to z2, the reaction was terminated at the time point when the loss of tricyclodecanedimethanol was confirmed by gel permeation chromatography (hereinafter, referred to as "GPC").

In the Synthesis Examples, unless particularly stated otherwise, the unit parts means parts by mass. Also, the measurement conditions for GPC and the method for measuring the epoxy equivalent are as follows.

GPC measurement conditions
Column: SHODEX SYSTEM-21 column
  (KF-803L, KF-802.5 (×2 columns), KF-802)
Connected eluent: Tetrahydrofuran
Flow rate: 1 ml/min
Column temperature: 40° C.
Detection: RI (Refractive index)
Calibration curve: Standard polystyrenes manufactured by Showa Denki Co., Ltd.
Epoxy equivalent
Method described in JIS K-7236

Synthesis Example x1

Synthesis of Polyvalent Carboxylic Acid (A)

While a flask equipped with a stirrer, a reflux cooling tube and a stirring apparatus was purged with nitrogen, 204 parts of methyl ethyl ketone (hereinafter, MEK), 294 parts of tricyclodecanedimethanol, 423 parts of 4-methylcyclohexanedicarboxylic acid anhydride (manufactured by New Japan Chemical Co., Ltd., RIKACID MH; hereinafter, H1), and 99 parts of cyclohexane-1,2,4-tricarboxylic acid-1,2-anhydride (H-TMAn manufactured by Mitsubishi Gas Chemical Company, Inc.; hereinafter, H-TMAn) were added to the flask, and the mixture was allowed to react for 2 hours at 50° C. Subsequently, the reaction mixture was heated and stirred for 4 hours at 70° C. 145 parts of MEK was further added to the solution thus obtained, and thereby 1166 parts of a MEK solution of a polyvalent carboxylic acid (A) was obtained. The solution thus obtained was colorless, the epoxy equivalent was 272 g/eq., and the concentration of the polyvalent carboxylic acid was 70% by mass.

Synthesis Example x2

Synthesis of Polyvalent Carboxylic Acid (A)

While a flask equipped with a stirrer, a reflux cooling tube and a stirring apparatus was purged with nitrogen, 12 parts of tricyclodecanedimethanol, 73 parts of H1, and 15 parts of H-TMAn were added to the flask, and the mixture was allowed to react for 3 hours at 40° C. Subsequently, the reaction mixture was heated and stirred for 1 hour at 70° C. Thus, 100 parts of a mixture of a polyvalent carboxylic acid (A) as a colorless liquid resin and H1 was obtained. The epoxy equivalent of this mixture was 171 g/eq., and the component ratio measured by GPC was such that reaction product of acid anhydride and bridged polycyclic diol:H1:H-TMAn=40.8:48.8:10.5.

Synthesis Example x3

Synthesis of Polyvalent Carboxylic Acid (A)

While a flask equipped with a stirrer, a reflux cooling tube and a stirring apparatus was purged with nitrogen, 36 parts of tricyclodecanedimethanol, 195 parts of H1, and 69 parts of H-TMAn were added to the flask, and the mixture was allowed to react for 3 hours at 40° C. Subsequently, the reaction mixture was heated and stirred for 1 hour at 70° C. Thus, 300 parts of a mixture of a polyvalent carboxylic acid (A) as a colorless liquid resin and H1 was obtained. The epoxy equivalent of this mixture was 162 g/eq., and the component ratio measured by GPC was such that reaction product of acid anhydride and bridged polycyclic diol:H1:H-TMAn=42.0:42.1:15.9.

Synthesis Example x4

Synthesis of Polyvalent Carboxylic Acid (A)

While a flask equipped with a stirrer, a reflux cooling tube and a stirring apparatus was purged with nitrogen, 45 parts of tricyclodecanedimethanol, 195 parts of H1, and 60 parts of H-TMAn were added to the flask, and the mixture was allowed to react for 3 hours at 40° C. Subsequently, the reaction mixture was heated and stirred for 1 hour at 70° C. Thus, 300 parts of a mixture of a polyvalent carboxylic acid (A) as a colorless liquid resin and H1 was obtained. The epoxy equivalent of this mixture was 170 g/eq., and the component ratio measured by GPC was such that reaction product of acid anhydride and bridged polycyclic diol:H1:H-TMAn=51.0:37.1:11.9.

Synthesis Example x5

Synthesis of Polyvalent Carboxylic Acid (A)

While a flask equipped with a stirrer, a reflux cooling tube and a stirring apparatus was purged with nitrogen, 40 parts of tricyclodecanedimethanol and 200 parts of H1 were added to the flask, and the mixture was allowed to react for 3 hours at 40° C. Subsequently, the reaction mixture was heated and stirred for 1 hour at 70° C. Thus, 240 parts of a polyvalent carboxylic acid (A) as a colorless liquid resin was obtained. The epoxy equivalent was 200 g/eq.

Synthesis Example x6

Synthesis of Epoxy Resin (C)

While a flask equipped with a thermometer, a dropping funnel, a cooling tube and a stirrer was subjected to nitrogen gas purge, 141.5 parts of (4-(4-(1,1-bis(p-hydroxyphenyl)ethyl)-α,α-dimethylbenzyl)phenol), 463 parts of epichlorohydrin, and 46 parts of methanol were introduced into the flask, and the temperature was raised to 70° C. while the mixture was stirred. Subsequently, 42 parts of flaky sodium hydroxide was added thereto in divided portions over 90 minutes, and then the mixture was stirred for one hour at 70° C. After completion of the reaction, 200 parts of water was added to wash the reaction mixture with water and to remove any salts produced therein and the like. Subsequently, excess solvent such as epichlorohydrin was distilled off from the oil layer at 140° C. under reduced pressure by using a rotary evaporator. 400 parts of methyl isobutyl ketone was added to the residue to dissolve the residue therein, and the temperature was increased to 70° C. 12 parts of a 30 mass % aqueous solution of sodium hydroxide was added thereto while the mixture was stirred, and the mixture was allowed to react for one hour. Subsequently, the reaction mixture was washed with water until the washing water became neutral, and methyl isobutyl ketone and the like were distilled off from the solution thus obtained, at 180° C. under reduced pressure by using a rotary evaporator. Thus, 190 parts of an epoxy resin (C) which was colorless or pale yellow in color was obtained. The epoxy resin thus obtained was a compound represented by formula (III), wherein n was 1.1. The epoxy equivalent was 209 g/eq., the softening point was 57.7° C., and the melt viscosity (200° C.) was 0.12 Pa·s.

Epoxy resin compositions and cured products of the present invention having the compositions (numerical values represent parts by mass) as disclosed in the following Examples were obtained. Furthermore, the evaluation methods and evaluation criteria for the resin compositions and the cured films are as follows.

(1) Viscosity: Measurement was made at 25° C. by using an E type viscometer (TV-200; manufactured by Toki Sangyo Co., Ltd.).

(2) Refractive index (25° C.): The refractive index (25° C.) of a cured epoxy resin composition was measured with a prism coupler refractometer (manufactured by Metricon Corp.).

(3) Glass transition temperature (Tg): The Tg point of a cured epoxy resin composition was measured in a viscoelasticity measurement system (DMS-6000; manufactured by Seico Electronics Industrial Co., Ltd.) in a tensile mode at a frequency of 1 Hz.

(4) 400-nm transmittance, 550-nm transmittance, YI value: The thickness of a cured film of a cured epoxy resin composition was measured with a dual type thickness meter (manufactured by Kett Electric Laboratory), and then the transmittances were measured with a spectrophotometer, U-3310 (manufactured by Hitachi, Ltd.). Further, the 400-nm transmittance, the 550-nm transmittance, and the YI value were determined as values calculated relative to a thickness of 100 μm.

(5) Light resistance test: A cured film of an epoxy resin composition was subjected to a light resistance test for 4 hours under the conditions of 60° C. and 60% RH by using an EYE SUPER UV TESTER SUV-W11 (manufactured by Iwasaki Electric Co., Ltd.), and then the external appearance was visually observed. Furthermore, the transmittances (400 nm and 550 nm), and the coloration (YI value) were measured in the same manner as in item (4).

(6) Heat resistance test: a cured film of an epoxy resin composition was introduced into a dryer at 120° C. for 100 hours, and then the external appearance was visually observed. Furthermore, the transmittances (400 nm and 550 nm), and the coloration (YI value) were measured in the same manner as in item (4).

(7) Total light transmittance, haze: Measurement was made with a haze meter, TC-H3DPK (manufactured by Tokyo Denshoku Co., Ltd.).

Example x1

39.9 parts of the mixture of a polyvalent carboxylic acid (component (A)) and H1 obtained in Synthesis Example x2; as a component (B), 10.3 parts of EHPE-3150 (manufactured by Daicel Chemical Industries, Ltd.: in formula (II), $R^3$=a trimethylolpropane residue, m=5, epoxy equivalent: 181); as components (C), 16.4 parts of the compound obtained in Synthesis Example x6 and 12.3 parts of NC-3000 (manufactured by Nippon Kayaku Co., Ltd.: a polyfunctional epoxy resin with a biphenyl structure, epoxy equivalent: 275); as components (D), 5.2 parts of JER-828 (manufactured by Mitsubishi Chemical Corp.: a liquid bisphenol A epoxy resin, epoxy equivalent: 185) and 15.9 parts of YD-012 (manufactured by Toto Chemical Corp.: a solid bisphenol A epoxy resin, epoxy equivalent: 670); and as other components, 0.3 parts of zinc octanoate, 0.2 parts of ADEKASTAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 43.2 parts of MEK as a diluting solvent were heated to 70° C. and mixed. Thus, a MEK dilution of the epoxy resin composition of the present invention with a solid content of 70% by mass was obtained. The viscosity of this MEK dilution of the epoxy resin composition was 98 mPa·s.

On a glass substrate, a frame having a size of 40 mm×25 mm×1 mm in depth was produced with a heat-resistant release tape, and the MEK dilution of the epoxy resin composition of the present invention was cast to a thickness of about 800 μm and dried therein at 80° C. for 50 minutes. In the middle of the drying process, vacuum debubbling was carried out once to remove bubbles. Thereafter, the resin composition was cooled to room temperature, and the state was checked. The epoxy resin composition of the present invention was solid.

Subsequently, the epoxy resin composition was cured in a dryer at 150° C. for 3 hours, and thus a cured product of the epoxy resin composition of the present invention was obtained. The refractive index (25° C.) was 1.568, and the glass transition temperature (Tg) was 135° C. The YI value of the cured film was 0.3, and the transmittance was 90.6% at 550 nm, and 90.1% at 400 nm.

Example x2

43.6 parts of the mixture of a polyvalent carboxylic acid (component (A)) and H1 obtained in Synthesis Example x2; 2.6 parts of EHPE-3150 as a component (B); 35.5 parts of the compound obtained in Synthesis Example x6 as a component (C); 10.4 parts of JER-828 and 8.0 parts of YD-012 as components (D); and as other components, 0.3 parts of HISHICOLIN PX4MP (manufactured by Nippon Chemical Industrial Co., Ltd.: a quaternary phosphonium salt) as a curing catalyst, and 43 parts of MEK as a diluting solvent were heated to 70° C. and mixed, and thus a MEK dilution of the epoxy resin composition of the present invention with a solid content of 70% was obtained. The viscosity of this MEK dilution of the epoxy resin composition with a solid content of 70% by mass was 40 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.566, and the glass transition temperature (Tg) was 140° C. The YI value of the cured film was 0.2, and the transmittance was 90.6% at 550 nm, and 90.6% at 400 nm.

Example x3

A MEK dilution of the epoxy resin composition of the present invention with a solid content of 70% by mass was obtained in the same manner as in Example x2, except that 0.3 parts of U-CAT5002 (tetraphenyl borate of a 1,8-diazabicyclo(5,4,0)-undecene-7 derivative manufactured by Sanyo Chemical Industries, Ltd.) was used as the curing catalyst among the other components used in Example x2. The viscosity of this MEK dilution of the epoxy resin composition of the present invention was 41 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.566, and the glass transition temperature (Tg) was 141° C.

Example x4

A MEK dilution of the epoxy resin composition of the present invention with a solid content of 70% by mass was obtained in the same manner as in Example x1, except that 41.3 part of the mixture of a polyvalent carboxylic acid (component (A)) and H1 obtained in Synthesis Example x2 (1 equivalent based on all the epoxy groups of component (B), component (C) and component (D)) was used, and 27.3 parts of the compound obtained in Synthesis Example x6 was used as the component (C), while NC-3000 was not used. The viscosity of this MEK dilution of the epoxy resin composition of the present invention was 62 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C. The YI value of the cured film was 0.3, and the transmittance was 90.6% at 550 nm, and 90.5% at 400 nm.

Subsequently, a light resistance test and a heat resistance test were carried out. There was slight coloration in the external appearance after the light resistance test, but there was no deterioration such as cracking, and transparency was satisfactory. The YI value was 5.6, and the transmittance was 90.0% at 550 nm, and 80.0% at 400 nm.

The external appearance after the heat resistance test was satisfactory, with almost no coloration. The YI value was 0.3, and the transmittance was 90.7% at 550 nm, and 90.5% at 400 nm.

Example x5

A MEK dilution of the epoxy resin composition of the present invention with a solid content of 70% by mass was obtained in the same manner as in Example x1, except that 66.6 parts of the polyvalent carboxylic acid solution at a concentration of 70% by mass obtained in Synthesis Example x1 was as the component (A); 4.8 parts of EHPE-3150 was used as the component (B); 12.0 parts of the compound obtained in Synthesis Example x6 was used as the component (C), while NC-3000 was not used; 8.1 parts of JER-828 and 28.5 parts of YD-012 were used as the components (D); and 23 parts of MEK was used as a diluting solvent for the other components. The viscosity of this MEK dilution of the epoxy resin composition of the present invention was 306 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.558, and the glass transition temperature (Tg) was 106° C.

Example x6

A MEK dilution of the epoxy resin composition of the present invention with a solid content of 70% by mass was obtained in the same manner as in Example x1, except that 41.2 parts of the mixture of a polyvalent carboxylic acid (component (A)) and H1 obtained in Synthesis Example x4 was used; 27.4 parts of the compound obtained in Synthesis Example x6 was used as the component (C), while NC-3000 was not used; and 5.2 parts of JER-828 and 16.0 parts of YD-012 were used as the components (D). The viscosity of this MEK dilution of the epoxy resin composition of the present invention was 70 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 142° C.

Example x7

A MEK dilution of the epoxy resin composition of the present invention with a solid content of 70% by mass was obtained in the same manner as in Example x1, except that 40.0 parts of the mixture of a polyvalent carboxylic acid (component (A)) and H1 obtained in Synthesis Example x3 was used; 10.6 parts of EHPE-3150 was used as the component (B); 28.0 parts of the compound obtained in Synthesis Example x6 was used as the component (C), while NC-3000 was not used; and 5.3 parts of JER-828 and 16.1 parts of YD-012 were used as the components (D). The viscosity of this MEK dilution of the epoxy resin composition of the present invention was 868 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.562, and the glass transition temperature (Tg) was 147° C.

Example x8

A MEK dilution of the epoxy resin composition of the present invention with a solid content of 70% by mass was obtained in the same manner as in Example x1, except that 40.6 parts of the mixture of a polyvalent carboxylic acid (component (A)) and H1 obtained in Synthesis Example x2 was used as the component (A); 11.3 parts of EHPE-3150 was used as the component (B); 20.7 parts of the compound obtained in Synthesis Example x6 was used as the component (C), while NC-3000 was not used; and as the components (D), 5.2 parts of JER-828, 15.9 parts of YD-012, and 6.2 parts of BPEF-G (OGSOL EG: manufactured by Osaka Gas Chemicals Co., Ltd., a solid epoxy resin having a fluorene structure, epoxy equivalent: 275) were used. The viscosity of this MEK dilution of the epoxy resin composition of the present invention was 62 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.563, and the glass transition temperature (Tg) was 139° C.

Example x9

A MEK dilution of the epoxy resin composition of the present invention with a solid content of 70% by mass was obtained in the same manner as in Example x1, except that 51.0 parts of the mixture of a polyvalent carboxylic acid (component (A)) and H1 obtained in Synthesis Example x2 was used as the component (A); 36.0 parts of EHPE-3150 and 13.0 parts of SELOXIDE 2021P (manufactured by Daicel Chemical Industries, Ltd.: 3,4-epoxycyclohexylmethyl-3,4-epoxycyclohexanecarboxylate, epoxy equivalent: 130) were used as the components (B); and the component (C) and the component (D) were not used. The viscosity of this MEK dilution of the epoxy resin composition of the present invention was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.512, and the glass transition temperature (Tg) was 160° C. The YI value of the cured film was 0.3, and the transmittance was 91.9% at 550 nm, and 91.6% at 400 nm.

Subsequently, a light resistance test was carried out. There was almost no coloration in the external appearance after the light resistance test, and the external appearance was satisfactory. The YI value was 0.5, and the transmittance was 91.7% at 550 nm, and 91.0% at 400 nm.

Example x10

A MEK dilution of the epoxy resin composition of the present invention with a solid content of 70% by mass was obtained in the same manner as in Example x1, except that 50.4 parts of the mixture of a polyvalent carboxylic acid (component (A)) and H1 obtained in Synthesis Example x2 was used as the component (A); 25.7 parts of EHPE-3150 and 13.0 parts of SELOXIDE 2021P were used as the components (B); 10.9 parts of the compound obtained in Synthesis Example x6 was used as the component (C); and the component (D) was not used. The viscosity of this MEK dilution of the epoxy resin composition of the present invention was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.523, and the glass transition temperature (Tg) was 157° C. The YI value of the cured film was 0.3, and the transmittance was 91.6% at 550 nm, and 91.5% at 400 nm.

Subsequently, a light resistance test was carried out. There was slight coloration in the external appearance after the light resistance test, but there was no deterioration such as cracking, and transparency was satisfactory. The YI value was 5.8, and the transmittance was 91.0% at 550 nm, and 80.0% at 400 nm.

Example x11

A MEK dilution of the epoxy resin composition of the present invention with a solid content of 70% by mass was obtained in the same manner as in Example x4, except that 0.5 parts of TINUVIN400 (manufactured by Ciba Specialty Chemicals Corp.: a hydroxyphenyltriazine-based ultraviolet absorber) was further added to the composition of Example x4. The viscosity of this MEK dilution of the epoxy resin composition of the present invention was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C. The YI value of the cured film was 0.4, and the transmittance was 90.4% at 550 nm, and 86.4% at 400 nm.

Subsequently, a light resistance test was carried out. There was slight coloration in the external appearance after the light resistance test, but there was no deterioration such as cracking, and transparency was satisfactory. The YI value was 1.3, and the transmittance was 90.7% at 550 nm, and 89.0% at 400 nm.

Comparative Example x1

40.6 parts of RIKACID MH700 (manufactured by New Japan Chemical Co., Ltd.: a mixture of methylhexahydrophthalic anhydride and hexahydrophthalic anhydride at 7:3; equivalent: 168 g/eq., hereinafter, referred to as H2) (1 equivalent based on all the epoxy groups of component (B), component (C) and component (D)); 10.3 parts of EHPE-3150 as the component (B); 27.3 parts of the compound of Synthesis Example x6 as the component (C); 5.2 parts of JER-828 and 15.9 parts of YD-012 as the components (D); and as other components, 0.3 parts of zinc octanoate, 0.2 parts of ADEKASTAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 42.8 parts of MEK as a diluting solvent were heated to 70° C. and mixed. Thus, a MEK dilution of a comparative resin composition with a solid content of 70% by mass was obtained.

Example x12

One part of toluene was added respectively to 100 parts of a MEK dilution of the composition obtained in Example x4 with a solid content of 70% by mass and to 100 parts of a MEK dilution of the composition obtained in Comparative Example x1 with a solid content of 70% by mass, and the mixtures were mixed. Thus, samples for volatilization test were obtained.

On a glass substrate, a frame having a size of 40 mm×25 mm×1 mm in depth was produced with a heat-resistant release tape, and each of the samples for volatilization test (MEK/toluene mixed solutions with a solid content of 69% by mass) of Example x4 and Comparative Example x1 was cast therein to a thickness of about 800 µm. The samples were weighed precisely, and then were dried for 15 minutes at 80° C. In the middle of the drying process, vacuum debubbling was carried out once to remove bubbles. Thereafter, while some solvent was still left, curing was carried out under the conditions described below, and cured products were obtained. The samples were weighed precisely after curing, and for the sample solids that had been cast, the volatile loss (%) during drying and curing was calculated. An observation was made of the external appearance of the surface of the cured products thus obtained, and the refractive indices were measured.

TABLE 1

Evaluation results

| | Volatile loss (%) | Appearance | Refractive index (25° C.) |
|---|---|---|---|
| Curing conditions: 120° C. for 1 hour + 150° C. for 3 hours | | | |
| Example x4 | 1.8 | Smooth with mirror surface | 1.561 |
| Comparative Example x1 | 20.3 | Surface unevenness exists with a matt tone | Undetectable |
| Curing conditions: 150° C. for 3 hours | | | |
| Example x4 | 1.1 | Smooth with mirror surface | 1.561 |
| Comparative Example x1 | 22.5 | Surface unevenness exists with a matt tone | Undetectable |

Example x13

MEK was added to the MEK dilution of the epoxy resin composition of the present invention with a solid content of 70% by mass that was obtained in Example x4, and the solid content was adjusted to 50% by mass. A commercially available glass cloth (E glass cloth: about 30 µm thick, plain weave) was introduced into the dilution to impregnate the glass cloth. The glass cloth was pulled up, and then was dried for 7 minutes at 120° C. The sheet obtained after drying was a solid film. This was further sandwiched between release-treated PET films, and the assembly was treated at 150° C. for 10 minutes while being pressed. The sheet was semicured, and thus a prepreg was obtained. Thereafter, the prepreg was cured in a dryer at 150° C. for 3 hours. A compositized sheet of a cured product of the epoxy resin composition of the present invention and a glass cloth was obtained, and the refractive index was 1.561. The total light transmittance was 92%, the haze was 2%, and the sheet was an uncolored transparent sheet.

As is obvious from the results of Examples x1 to x11, the epoxy resin compositions of the present invention may give cured products which have excellent transparency without being colored, have satisfactory heat resistance and light resistance, and have various refractive indices. In Example x12, it is understood that by using a polyvalent carboxylic acid (A), an obviously smooth film may be obtained as compared with the case of Comparative Example x1 that used a common acid anhydride curing agent. Furthermore, while a large amount of the acid anhydride curing agent of Comparative Example x1 volatilizes, and thereby the component composition ratio of the cured film changes, it can be seen that volatilization hardly occurs in the present invention. Since a change in the component composition ratio of the cured film caused by volatilization leads to a shift in the refractive index of the cured film, when the cured film is combined with a glass cloth, the refractive indices do not match, and it is difficult to obtain a transparent sheet. However, it can be seen that there is no such problem in the Examples of the present invention. As can be seen from the results of Example x13, when the epoxy resin composition of the present invention is used, a cured film having a stable refractive index may be obtained, and it was verified that a transparent film is obtained even when combined with a glass cloth.

Example x14

A MEK dilution of the epoxy resin composition of the present invention with a solid content of 70% by mass was obtained in the same manner as in Example x4, except that ADEKASTAB 260 and bis(1-undecanoxy-2,2,6,6-tetramethylpiperidin-4-yl) carbonate used in Example x4 were excluded, and 0.5 parts of TINUVIN 479 (manufactured by Ciba Specialty Chemicals Corp.: a hydroxyphenyltriazine-based ultraviolet absorber) was added. The viscosity of this MEK dilution of the epoxy resin composition was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C. The YI value of the cured film was 0.4, and the transmittance was 90.7% at 550 nm, and 86.6% at 400 nm.

Subsequently, a light resistance test was carried out. There was slight coloration in the external appearance after the light resistance test, but there was no deterioration such as cracking, and transparency was satisfactory. The YI value was 0.7, and the transmittance was 90.7% at 550 nm, and 85.9% at 400 nm.

Example x15

A MEK dilution of the epoxy resin composition of the present invention with a solid content of 70% by mass was obtained in the same manner as in Example x4, except that 0.2 parts of TINUVIN 123 (manufactured by Ciba Specialty Chemicals Corp.: a hindered amine-based photostabilizer) was further added to the composition of Example x14. The viscosity of this MEK dilution of the epoxy resin composition was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C.

The YI value of the cured film was 0.3, and the transmittance was 90.7% at 550 nm, and 87.6% at 400 nm.

Subsequently, a light resistance test was carried out. There was slight coloration in the external appearance after the light resistance test, but there was no deterioration such as cracking, and transparency was satisfactory. The YI value was 0.6, and the transmittance was 90.6% at 550 nm, and 86.9% at 400 nm.

Example x16

A MEK dilution of the epoxy resin composition of the present invention with a solid content of 70% by mass was obtained in the same manner as in Example x14, except that 0.5 parts of TINUVIN 405 (manufactured by Ciba Specialty Chemicals Corp.: a hydroxyphenyltriazine-based ultraviolet absorber) was added to the composition of Example x14 instead of TINUVIN 479. The viscosity of this MEK dilution of the epoxy resin composition was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C. The YI value of the cured film was 0.5, and the transmittance was 90.7% at 550 nm, and 88.4% at 400 nm.

Subsequently, a light resistance test was carried out. There was slight coloration in the external appearance after the light resistance test, but there was no deterioration such as cracking, and transparency was satisfactory. The YI value was 0.8, and the transmittance was 90.6% at 550 nm, and 87.9% at 400 nm.

Example x17

A MEK dilution of the epoxy resin composition of the present invention with a solid content of 70% by mass was obtained in the same manner as in Example x15, except that TINUVIN 144 (manufactured by Ciba Specialty Chemicals Corp.: a hindered amine-based photostabilizer) was used instead of TINUVIN 123 used in Example x15. The viscosity of this MEK dilution of the epoxy resin composition was 33 mPa·s.

The MEK dilution of the epoxy resin composition of the present invention thus obtained was dried in the same manner as in Example x1, and the epoxy resin composition of the present invention was solid.

Subsequently, a cured product of the epoxy resin composition of the present invention was obtained in the same manner as in Example x1. The refractive index (25° C.) was 1.561, and the glass transition temperature (Tg) was 145° C. The YI value of the cured film was 0.3, and the transmittance was 90.7% at 550 nm, and 87.8% at 400 nm.

Subsequently, a light resistance test was carried out. There was slight coloration in the external appearance after the light resistance test, but there was no deterioration such as cracking, and transparency was satisfactory. The YI value was 0.5, and the transmittance was 90.6% at 550 nm, and 88.0% at 400 nm.

Synthesis Example y1

Synthesis of Polyvalent Carboxylic Acid (A)

While a flask equipped with a stirrer, a reflux cooling tube and a stirring apparatus was purged with nitrogen, 10 parts of toluene, 80 parts of 2,4-diethyl-1,5-pentanediol (KYOWAOL PD9 manufactured by KH Neochem Co., Ltd.) and 168 parts of H2 were introduced into the flask, and the mixture was heated and stirred for 4 hours at 100° C. Loss of the raw materials was confirmed by GPC. After completion of the reaction, residual solvent was distilled off by using a rotary evaporator, and thereby 246 parts of the polyvalent carboxylic acid (A) of the present invention, which was a colorless solid resin, was obtained. The purity measured by GPC was 97% by area, and the epoxy equivalent was 248 g/eq.

Synthesis Example y2

Synthesis of Polyvalent Carboxylic Acid (A)

While a flask equipped with a stirrer, a reflux cooling tube and a stirring apparatus was purged with nitrogen, 20 parts of 2,4-diethyl-1,5-pentanediol (KYOWADIOL PD9 manufactured by KH Neochem Co., Ltd.) and 100 parts of H1 were introduced into the flask, and the mixture was heated and stirred for 4 hours at 60° C. It was confirmed by GPC that the fraction of 2,4-diethyl-1,5-pentanediol was 1% by area or less, and 120 parts of a mixture of a polyvalent carboxylic acid (A) as a colorless liquid resin and H1 was obtained. The epoxy equivalent of this mixture was 201 g/eq., and the component ratio measured by GPC was such that the reaction product of acid anhydride and bridged polycyclic diol:H1=43:57. The viscosity at 50° C. was 1100 mPa·s (16200 mPa·s at 25° C.; E type viscometer).

Example y1

34.8 parts of the mixture of a polyvalent carboxylic acid (component (A)) and H1 obtained in Synthesis Example y2; as the component (B), 9.5 parts of EHPE-3150 (manufactured by Daicel Chemical Industries, Ltd.: in formula (II), $R^3$=a trimethylolpropane residue, m=5, epoxy equivalent: 181); as the components (D), 9.6 parts of JER-828 (manufactured by Mitsubishi Chemical Corp.: a liquid bisphenol A epoxy resin, epoxy equivalent: 185) and 46.2 parts of YD-012 (manufactured by Toto Chemical Corp.: a solid bisphenol A epoxy resin, epoxy equivalent: 670); and as other components, 0.3 parts of HISHICOLIN PX4MP (manufactured by Nippon Chemical Industrial Co., Ltd.: a quaternary phosphonium salt) as a curing catalyst, 0.2 parts of ADEKASTAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 25.2 parts of MEK as a diluting solvent were heated to 70° C. and mixed. Thus, a MEK dilution of the epoxy resin composition (y1) of the present invention with a solid content of 80% (y1D) was obtained. The viscosity of y1D was 309 mPa·s.

y1 thus obtained was further adjusted to a solid content of 70% (y1D') by using MEK.

On a glass substrate, a frame having a size of 40 mm×25 mm×1 mm in depth was produced with a heat-resistant release tape, and y1D' was cast to a thickness of about 800 μm and dried therein at 80° C. for 50 minutes. In the middle of the drying process, vacuum debubbling was carried out once to remove bubbles. Thereafter, the resin composition was cooled to room temperature, and the state was checked. y1 was solid.

Subsequently, y1 was cured in a dryer at 150° C. for 3 hours, and a cured product of y1 was obtained. The refractive index (25° C.) was 1.555, and the glass transition temperature (Tg) was 101° C. The YI value of the cured product was 0.2, and the transmittance was 90.7% at 550 nm, and 90.5% at 400 nm.

Example y2

A MEK dilution of the epoxy resin composition (y2) of the present invention with a solid content of 70% by mass (y2D) was obtained in the same manner as in Example y1, except that 43.4 parts of the mixture of a polyvalent carboxylic acid (component (A)) and H1 obtained in Synthesis Example y2; as the component (B), 11.7 parts of EHPE-3150; as the component (C), 12.5 parts of the compound obtained in Synthesis Example x6; as the components (D), 9.5 parts of JER-828 and 22.9 parts of YD-012; and as other components, 0.3 parts of zinc octanoate, 0.2 parts of ADEKASTAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 43.2 parts of MEK as a diluting solvent were used. The viscosity of y2D was 57 mPa·s.

y2D thus obtained was dried in the same manner as in Example y1, and y2 was solid.

Subsequently, a cured product of y2 was obtained in the same manner as in Example y1. The refractive index (25° C.) was 1.551, and the glass transition temperature (Tg) was 106° C. The YI value of the cured film was 0.2, and the transmittance was 90.7% at 550 nm, and 91.0% at 400 nm.

Subsequently, a light resistance test and a heat resistance test were carried out. There was slight coloration in the external appearance after the light resistance test, but there was no deterioration such as cracking, and transparency was satisfactory. The YI value was 5.2, and the transmittance was 90.1% at 550 nm, and 78.8% at 400 nm.

The external appearance after the heat resistance test was satisfactory with almost no coloration. The YI value was 0.3, and the transmittance was 90.7% at 550 nm, and 90.5% at 400 nm.

Example y3

A MEK dilution of the epoxy resin composition (y3) of the present invention with a solid content of 70% by mass (y3D) was obtained in the same manner as in Example y1, except that 37.1 parts of the mixture of a polyvalent carboxylic acid (component (A)) and H1 obtained in Synthesis Example y2; as the component (B), 4.7 parts of EHPE-3150; as the component (C), 10.1 parts of the compound obtained in Synthesis Example x6; as the components (D), 9.6 parts of JER-828 and 38.5 parts of YD-012; and as other components, 0.3 parts of zinc octanoate, 0.2 parts of ADEKASTAB 260 as an additive, 0.2 parts of bis(1-undecanoxy-2,2,6,6-tetramethylpiperidin-4-yl) carbonate, and 43.2 parts of MEK as a diluting solvent were used. The viscosity of y3D was 104 mPa·s.

y3D thus obtained was dried in the same manner as in Example y1, and y3 was solid.

Subsequently, a cured product of y3 was obtained in the same manner as in Example y1. The refractive index (25° C.) was 1.561, and the glass transition temperature (Tg) was 99° C. The YI value of the cured film was 0.1, and the transmittance was 90.6% at 550 nm, and 90.9% at 400 nm.

Subsequently, a light resistance test and a heat resistance test were carried out. There was slight coloration in the external appearance after the light resistance test, but there was no deterioration such as cracking, and transparency was satisfactory. The YI value was 5.6, and the transmittance was 90.0% at 550 nm, and 78.0% at 400 nm.

Example y4

A MEK dilution of the epoxy resin composition (y4) of the present invention with a solid content of 70% by mass (y4D) was obtained in the same manner as in Example y1, except that 48.5 parts of the mixture of a polyvalent carboxylic acid (component (A)) and H1 obtained in Synthesis Example y2 (1 equivalent based on all the epoxy groups of component (B), component (C) and component (D)); as the component (B), 10.3 parts of EHPE-3150; as the component (C), 27.3 parts of the compound obtained in Synthesis Example x6; as the components (D), 5.2 parts of JER-828 and 15.9 parts of YD-012; and as other components, 0.3 parts of zinc octanoate, 0.2 parts of ADEKASTAB 260, 0.2 parts of bis(1-undecanoxy-2,2,6,6-tetramethylpiperidin-4-yl) carbonate, and 46.2 parts of MEK as a diluting solvent were used. The viscosity of y4D was 60 mPa·s.

y4D thus obtained was dried in the same manner as in Example y1, and y4 was solid.

Subsequently, a cured product of y4 was obtained in the same manner as in Example y1. The refractive index (25° C.) was 1.552, and the glass transition temperature (Tg) was 107° C. The YI value of the cured film was 0.2, and the transmittance was 90.9% at 550 nm, and 90.8% at 400 nm.

Example y5

45.9 parts of the polyvalent carboxylic acid (A) obtained in Synthesis Example y1; 4.8 parts of EHPE-3150 as the component (B); 7.7 parts of the compound obtained in Synthesis Example x6 as the component (C); as the components (D), 8.1 parts of JER-828, 28.5 parts of YD-012, and 5.0 parts of BPEF-G (OGSOLEG: manufactured by Osaka Gas Chemicals Co., Ltd., a solid epoxy resin having a fluorene structure, epoxy equivalent: 275); and as other components, 0.3 parts of zinc octanoate, 0.2 parts of ADEKASTAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 43.2 parts of MEK as a diluting solvent were heated to 70° C. and mixed. Thus, a MEK dilution of the epoxy resin composition (y5) of the present invention with a solid content of 70% by mass (y5D) was obtained. The viscosity of y5D was 286 mPa·s.

Y5D thus obtained was dried in the same manner as in Example y1, and y5 was solid.

Subsequently, a cured product of y5 was obtained in the same manner as in Example y1. The refractive index (25° C.) was 1.560, and the glass transition temperature (Tg) was 102° C. The YI value of the cured film was 0.1, and the transmittance was 90.6% at 550 nm, and 90.8% at 400 nm.

Example y6

A MEK dilution of the epoxy resin composition (y6) of the present invention with a solid content of 70% by mass (y6D) was obtained in the same manner as in Example y4, except that 0.5 parts of TINUVIN 400 (manufactured by Ciba Specialty Chemicals Corp.: a hydroxyphenyltriazine-based ultraviolet absorber) was further added to the composition of Example y3. The viscosity of y6D was 106 mPa·s.

y6D thus obtained was dried in the same manner as in Example y1, and y6 was solid.

Subsequently, a cured product of y6 was obtained in the same manner as in Example y1. The refractive index (25° C.) was 1.561, and the glass transition temperature (Tg) was 100° C. The YI value of the cured film was 0.3, and the transmittance was 90.4% at 550 nm, and 88.4% at 400 nm.

Subsequently, a light resistance test was carried out. There was slight coloration in the external appearance after the light resistance test, but there was no deterioration such as cracking, and transparency was satisfactory. The YI value was 1.3, and the transmittance was 90.5% at 550 nm, and 89.0% at 400 nm.

Comparative Example y1

40.6 parts of RIKACID MH700 (manufactured by New Japan Chemical Co., Ltd.: a mixture of methylhexahydrophthalic anhydride and hexahydrophthalic anhydride at 7:3; equivalent: 168 g/eq) (1 equivalent based on all the epoxy groups of component (B), component (C) and component (D)); 10.3 parts of EHPE-3150 as the component (B); 27.3 parts of the compound of Synthesis Example x6 as the component (C); 5.2 parts of JER-828 and 15.9 parts of YD-012 as the components (D); and as other components, 0.3 parts of zinc octanoate, 0.2 parts of ADEKASTAB 260 as an additive, 0.2 parts of bis(1-undecanoxy-2,2,6,6-tetramethylpiperidin-4-yl) carbonate, and 42.8 parts of MEK as a diluting solvent were heated to 70° C. and mixed. Thus, a MEK dilution of a comparative resin composition with a solid content of 70% by mass was obtained.

Example y7

One part of toluene was added respectively to 100 parts of a MEK dilution of the composition obtained in Example y4 with a solid content of 70% by mass and to 100 parts of a MEK dilution of the composition obtained in Comparative Example y1 with a solid content of 70% by mass, and the mixtures were mixed. Thus, samples for volatilization test were obtained.

On a glass substrate, a frame having a size of 40 mm×25 mm×1 mm in depth was produced with a heat-resistant release tape, and each of the samples for volatilization test (MEK/toluene mixed solutions with a solid content of 69% by mass) of Example y4 and Comparative Example y1 was cast therein to a thickness of about 800 μm. The samples were weighed precisely, and then were dried for 15 minutes at 80° C. In the middle of the drying process, vacuum debubbling was carried out once to remove bubbles. Thereafter, while some solvent was still left, curing was carried out under the conditions described below, and cured products were obtained. The samples were weighed precisely after curing, and for the sample solids that had been cast, the volatile loss (%) during drying and curing was calculated. An observation was made of the external appearance of the surface of the cured products thus obtained, and the refractive indices were measured.

TABLE 2

| | Evaluation results | | |
|---|---|---|---|
| | Volatile loss (%) | Appearance | Refractive index (25° C.) |
| Curing conditions: 120° C. for 1 hour + 150° C. for 3 hours | | | |
| Example y4 | 1.4 | Smooth with mirror surface | 1.552 |
| Comparative | 20.3 | Surface unevenness | Undetectable |

TABLE 2-continued

| | Evaluation results | | |
|---|---|---|---|
| | Volatile loss (%) | Appearance | Refractive index (25° C.) |
| Example y1 | | exists with a matt tone | |
| Curing conditions: 150° C. for 3 hours | | | |
| Example y4 | 2.1 | Smooth with mirror surface | 1.552 |
| Comparative Example y1 | 22.5 | Surface unevenness exists with a matt tone | Undetectable |

Example y8

MEK was further added to y3D that was obtained in Example y3, and the solid content was adjusted to 50% by mass. A commercially available glass cloth (E glass cloth: about 30 μm thick, plain weave; refractive index: 1.560) was introduced therein to impregnate the glass cloth. The glass cloth was pulled up, and then was dried for 7 minutes at 120° C. The sheet obtained after drying was a solid film. This was further sandwiched between release-treated PET films, and the assembly was treated at 150° C. for 10 minutes while being pressed. The sheet was semicured, and thus a prepreg was obtained. Thereafter, the prepreg was cured in a dryer at 150° C. for 3 hours. A compositized sheet of a cured product of the epoxy resin composition of the present invention and a glass cloth was obtained, and the refractive index was 1.560. The total light transmittance was 92%, the haze was 2%, and the sheet was an uncolored transparent sheet.

As is obvious from the results of Examples y1 to y8, the epoxy resin compositions of the present invention may give cured products which have excellent transparency without being colored, have satisfactory heat resistance and light resistance, and have various refractive indices. In Example y7, it is understood that by using a polyvalent carboxylic acid (B), an obviously smooth film may be obtained as compared with the case of Comparative Example y1 that used a common acid anhydride curing agent. Furthermore, while a large amount of the acid anhydride curing agent of Comparative Example y1 volatilizes, and thereby the component composition ratio of the cured film changes, it can be seen that volatilization hardly occurs in the present invention. Since a change in the component composition ratio of the cured film caused by volatilization leads to a shift in the refractive index of the cured film, when the cured film is combined with a glass cloth, the refractive indices do not match, and it is difficult to obtain a transparent sheet. However, it can be seen that there is no such problem in the Examples of the present invention. As can be seen from the results of Example y8, when the epoxy resin composition of the present invention is used, a cured film having a stable refractive index may be obtained, and it was verified that a transparent film is obtained even when combined with a glass cloth.

Synthesis Example z1

Synthesis of Polyvalent Carboxylic Acid (A)

While a flask equipped with a stirrer, a reflux cooling tube and a stirring apparatus was purged with nitrogen, 125 parts of ditrimethylolpropane (DI-TMP manufactured by Perstorp Group), 336 parts of methylcyclohexanedicarboxylic acid anhydride (RIKACID MH manufactured by New Japan Chemical Co., Ltd.) and 115 parts of methyl ethyl ketone were added to the flask, and the mixture was stirred for 7 hours at 80° C. After completion of the reaction, 198 parts of methyl ethyl ketone was added thereto to adjust the concentration, and thus 658 parts of a methyl ethyl ketone solution of a polyvalent carboxylic acid (A) at a concentration of 70% was obtained.

Example z1

53.1 parts of the polyvalent carboxylic acid (A) obtained in Synthesis Example z1; as a component (B), 2.2 parts of EHPE-3150 (manufactured by Daicel Chemical Industries, Ltd.: in formula (II), $R^3$=a trimethylolpropane residue, m=5, epoxy equivalent: 181 g/eq.); as a component (C), 7.1 parts of the compound obtained in Synthesis Example x6; as components (D), 8.9 parts of JER-828 (manufactured by Mitsubishi Chemical Corp.: a liquid bisphenol A epoxy resin, epoxy equivalent: 185 g/eq.) and 44.6 parts of YD-012 (manufactured by Toto Chemical Corp.: a solid bisphenol A epoxy resin, epoxy equivalent: 670 g/eq.); and as other components, 0.3 parts of HISHICOLIN PX4MP (manufactured by Nippon Chemical Industrial Co., Ltd.: a quaternary phosphonium salt) as a curing catalyst, 0.2 parts of ADEKA-STAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 51.2 parts of MEK as a diluting solvent were heated to 70° C. and mixed. Thus, a MEK dilution of the epoxy resin composition of the present invention with a solid content of 60% by mass was obtained. The viscosity of this MEK dilution was 54 mPa·s.

On a glass substrate, a frame having a size of 40 mm×25 mm×1 mm in depth was produced with a heat-resistant release tape, and the MEK dilution of the epoxy resin composition of the present invention was cast therein to a thickness of about 800 μm. The dilution was dried for 50 minutes at 80° C. In the middle of the drying process, vacuum debubbling was carried out once to remove bubbles. Thereafter, the resin composition was cooled to room temperature, and the state was checked. The epoxy resin composition of the present invention was solid.

Subsequently, the epoxy resin composition was cured in a dryer at 150° C. for 3 hours, and thus a cured product of the epoxy resin composition of the present invention was obtained. The refractive index (25° C.) was 1.561, and the glass transition temperature (Tg) was 110° C. The YI value of the cured film was 0.2, and the transmittance was 90.7% at 550 nm, and 90.5% at 400 nm.

Subsequently, a light resistance test and a heat resistance test were carried out. There was slight coloration in the external appearance after the light resistance test, but there was no deterioration such as cracking, and transparency was satisfactory. Regarding the external appearance after the heat resistance test, there was no coloration and no deterioration such as cracking. Transparency was satisfactory.

Example z2

A MEK dilution of the epoxy resin composition of the present invention with a solid content of 60% by mass was obtained in the same manner as in Example z1, except that 83.4 parts of the polyvalent carboxylic acid (A) obtained in Synthesis Example z1, and 30.8 parts of EHPE-3150 and 10.8 parts of SELOXIDE 2021P (manufactured by Daicel Chemical Industries, Ltd.: 3,4-epoxycyclohexenylmethyl 3′,4′-epoxycyclohexenecarboxylate, epoxy equivalent: 130 g/eq.) as the components (B) were used, the component (C) and the component (D) were not used, and as other components, 0.2 parts of HISHICOLIN PX4MP (manufactured by Nippon Chemical Industrial Co., Ltd.: a quaternary phosphonium salt) as a curing catalyst, 0.2 parts of ADEKA-STAB 260 (manufactured by Adeka Corp.: a phosphorus-based oxidation inhibitor) as an additive, 0.2 parts of bis(1-undecanoxy-2,2,6,6-tetramethylpiperidin-4-yl) carbonate, and 42.1 parts of MEK as a diluting solvent were used. The viscosity of this MEK dilution of the epoxy resin composition was 30 mPa·s.

The MEK dilution of the epoxy resin composition of the present invention thus obtained was dried in the same manner as in Example z1, and the epoxy resin composition of Example z2 was liquid.

Subsequently, a cured product of the epoxy resin composition of the present invention was obtained in the same manner as in Example z1. The refractive index (25° C.) was 1.500, and transparency was satisfactory. Subsequently, a light resistance test and a heat resistance test were carried out. There was slight coloration in the external appearance after the light resistance test, but there was no deterioration such as cracking, and transparency was satisfactory. Regarding the external appearance after the heat resistance test, there was no coloration and no deterioration such as cracking. Transparency was satisfactory.

Example z3

A MEK dilution of the epoxy resin composition of the present invention with a solid content of 60% by mass was obtained in the same manner as in Example z1, except that 79.6 parts of the polyvalent carboxylic acid (A) obtained in Synthesis Example z1 (1 equivalent based on all the epoxy groups of component (B), component (C) and component (D)); 10.3 parts of EHPE-3150 as the component (B); 27.3 parts of the compound obtained in Synthesis Example x6 as the component (C); 5.2 parts of JER-828 and 15.9 parts of YD-012 as the components (D); and as other components, 0.3 parts of zinc octanoate, 0.2 parts of ADEKASTAB 260, 0.2 parts of bis(1-undecanoxy-2,2,6,6-tetramethylpiperidin-4-yl) carbonate, and 52.9 parts of MEK as a diluting solvent were used. The viscosity of this MEK dilution of the epoxy resin composition was 104 mPa·s.

The MEK dilution of the epoxy resin composition of the present invention thus obtained was dried in the same manner as in Example z1, and the epoxy resin composition of the present invention was solid.

Subsequently, a cured product of the epoxy resin composition of the present invention was obtained in the same manner as in Example z1. The refractive index (25° C.) was 1.550.

Comparative Example z1

40.6 parts of RIKACID MH-700 (manufactured by New Japan Chemical Co., Ltd.: a mixture of methylhexahydrophthalic anhydride and hexahydrophthalic anhydride at 7:3; equivalent: 168 g/eq) (1 equivalent based on all the epoxy groups of component (B), component (C) and component (D)); 10.3 parts of EHPE-3150 as the component (B); 27.3 parts of the compound of Synthesis Example z3 as the component (C); 5.2 parts of JER-828 and 15.9 parts of YD-012 as the components (D); and as other components, 0.3 parts of zinc octanoate, 0.2 parts of ADEKASTAB 260 as an additive, 0.2 parts of bis(1-undecanoxy-2,2,6,6-tetramethylpiperidin-4-yl) carbonate, and 66.6 parts of MEK as a diluting solvent were heated to 70° C. and mixed. Thus, a MEK dilution of a comparative resin composition with a solid content of 60% by mass was obtained.

Example z4

One part of toluene was added respectively to 100 parts of a MEK dilution of the composition obtained in Example z3 with a solid content of 60% by mass and to 100 parts of a MEK dilution of the composition obtained in Comparative Example z1 with a solid content of 60% by mass, and the mixtures were mixed. Thus, samples for volatilization test were obtained.

On a glass substrate, a frame having a size of 40 mm×25 mm×1 mm in depth was produced with a heat-resistant release tape, and each of the samples for volatilization test (MEK/toluene mixed solutions with a solid content of 59% by mass) of Example z4 and Comparative Example z1 was cast therein to a thickness of about 800 μm. The samples were weighed precisely, and then were dried for 15 minutes at 80° C. In the middle of the drying process, vacuum debubbling was carried out once to remove bubbles. Thereafter, while some solvent was still left, curing was carried out under the conditions described below, and cured products were obtained. The samples were weighed precisely after curing, and for the sample solids that had been cast, the volatile loss (% by mass) during drying and curing was calculated. An observation was made of the external appearance of the surface of the cured products thus obtained, and the refractive indices were measured.

TABLE 3

Evaluation results
Curing conditions: 150° C. for 3 hours

| | Volatile loss (%) | Appearance | Refractive index (25° C.) |
|---|---|---|---|
| Example Z3 | 0.0 | Smooth with mirror surface | 1.550 |
| Comparative Example Z1 | 24.0 | Surface unevenness exists with a matt tone | Undetectable |

Example z5

MEK was added to the MEK dilution of the epoxy resin composition of the present invention with a solid content of 60% by mass that was obtained in Example z1, and the solid content was adjusted to 50% by mass. A commercially available glass cloth (E glass cloth: about 30 μm thick, plain weave; refractive index: 1.560) was introduced into the dilution to impregnate the glass cloth. The glass cloth was pulled up, and then was dried for 7 minutes at 120° C. The sheet obtained after drying was a solid film. This was further sandwiched between release-treated PET films, and the assembly was treated at 150° C. for 10 minutes while being pressed. The sheet was semicured, and thus a prepreg was obtained. Thereafter, the prepreg was cured in a dryer at 150° C. for 3 hours. A compositized sheet of a cured product of the epoxy resin composition of the present invention and a glass cloth was obtained, and the refractive index was 1.560. The total light transmittance was 92%, the haze was 3%, and the sheet was an uncolored transparent sheet.

As is obvious from the results of Examples z1 to z4, the epoxy resin compositions of the present invention may give cured products which have excellent transparency without being colored, and have various refractive indices. In Example z4, it is understood that by using a polyvalent carboxylic acid (A), an obviously smooth film may be obtained as compared with the case of Comparative Example z1 that used a common acid anhydride curing agent. Furthermore, while a large amount of the acid anhydride curing agent of Comparative Example z1 volatilizes, and thereby the component composition ratio of the cured film changes, it can be seen that volatilization hardly occurs in the present invention. Since a change in the component composition ratio of the cured film caused by volatilization leads to a shift in the refractive index of the cured film, when the cured film is combined with a glass cloth, the refractive indices do not match, and it is difficult to obtain a transparent sheet. However, it can be seen that there is no such problem in the Examples of the present invention. As can be seen from the results of Example z5, when the epoxy resin composition of the present invention is used, a cured film having a stable refractive index may be obtained, and it was verified that a transparent film is obtained even when combined with a glass cloth.

INDUSTRIAL APPLICABILITY

The epoxy resin composition of the present invention and a cured product thereof are primarily suitable for optical sheets which are used in liquid crystal displays, plasma displays, EL displays, display devices of portable equipment, solar cells and the like.

The invention claimed is:

1. A cured product obtainable by curing an epoxy resin composition for optical sheets, the composition comprising a polyvalent carboxylic acid (A) represented by formula (I):

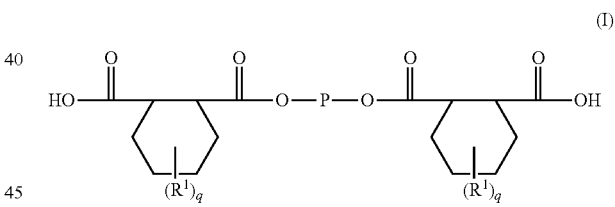

(I)

wherein, R$^1$'s each independently represent a hydrogen atom, an alkyl group having 1 to 15 carbon atoms, or a carboxyl group; q represents the number of substituent R$^1$'s, and represents an integer from 1 to 4; and P represents the following X:

X.

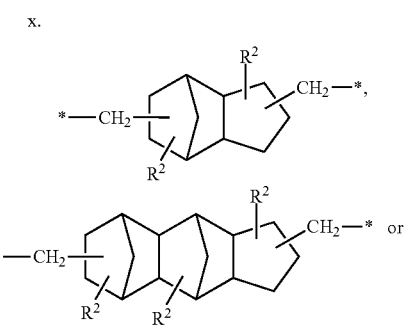

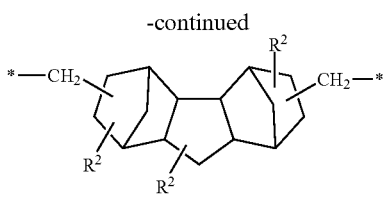

wherein, there may be a plural number of $R^2$'s per ring, and $R^2$'s each independently represent a hydrogen atom or a methyl group; and * represents a bonding site linked to the oxygen atom; and an epoxy resin (B) having an aliphatic cyclic structure in the molecule, and the cured product having a refractive index at 25° C. of 1.50 or higher.

2. The cured product according to claim 1, wherein all $R^2$'s of the polyvalent carboxylic acid (A) represent hydrogen atoms.

3. The cured product according to claim 2, wherein 50 mol % or more of all $R^1$'s of the polyvalent carboxylic acid (A) represent methyl groups and/or carboxyl groups.

4. The cured product according to claim 3, wherein the polyvalent carboxylic acid (A) is a reaction product between at least one bridged polycyclic diol selected from tricyclodecanedimethanol and pentacyclopentadecanedimethanol, and at least one acid anhydride selected from methylhexahydrophthalic anhydride and cyclohexane-1,2,4-tricarboxylic acid anhydride.

5. The cured product according to claim 2, wherein the polyvalent carboxylic acid (A) is a reaction product between at least one bridged polycyclic diol selected from tricyclodecanedimethanol and pentacyclopentadecanedimethanol, and at least one acid anhydride selected from methylhexahydrophthalic anhydride and cyclohexane-1,2,4-tricarboxylic acid anhydride.

6. The cured product according to claim 1, wherein the polyvalent carboxylic acid (A) is a reaction product between at least one bridged polycyclic diol selected from tricyclodecanedimethanol and pentacyclopentadecanedimethanol, and at least one acid anhydride selected from methylhexahydrophthalic anhydride and cyclohexane-1,2,4-tricarboxylic acid anhydride.

7. The cured product according to claim 1, wherein the epoxy resin (B) having an aliphatic cyclic structure in the molecule is a compound represented by formula (II):

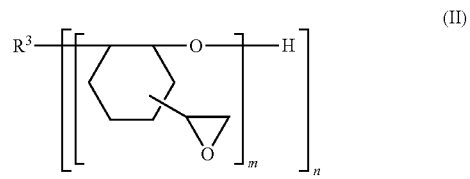

wherein, $R^3$ represents an n-valent radical of an aliphatic alcohol obtained by removal of n hydroxyl groups; m represents an average value and represents an integer from 1 to 20; and n represents an integer from 1 to 10.

8. The cured product according to claim 1, further comprising an aromatic polyfunctional epoxy resin (C) having three or more epoxy groups in the molecule.

9. The cured product according to claim 8, wherein the aromatic polyfunctional epoxy resin (C) having three or more epoxy groups in the molecule is a compound represented by formula (III):

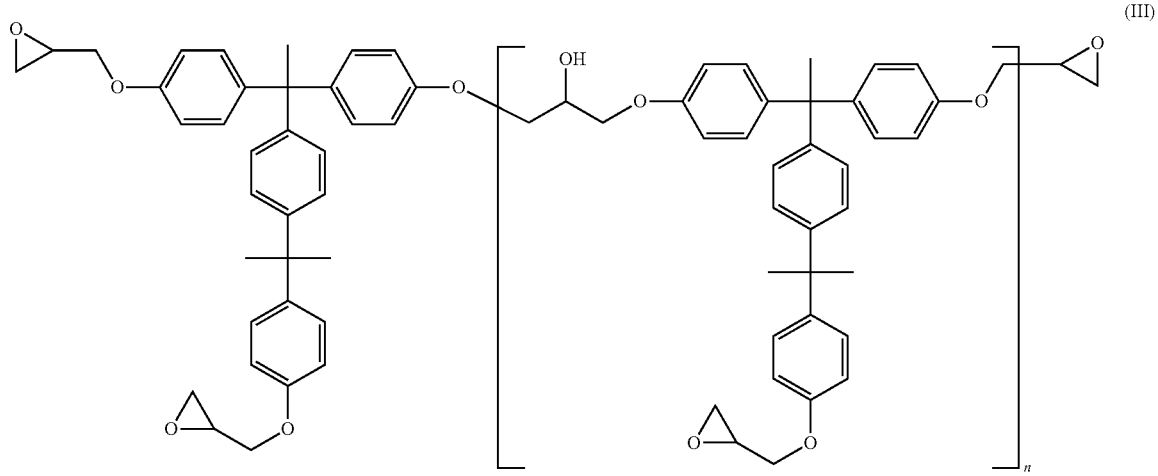

wherein, n represents an integer of 1 or 2.

10. The cured product according to claim 1, further comprising an epoxy resin (D) other than the epoxy resin (B) having an aliphatic cyclic structure and other than the aromatic polyfunctional epoxy resin (C) having three or more epoxy groups in the molecule, and an acid anhydride.

11. An optical sheet comprising the cured product according to claim 1.

* * * * *